(12) United States Patent
Li et al.

(10) Patent No.: US 12,542,595 B2
(45) Date of Patent: Feb. 3, 2026

(54) BEAM-ASSOCIATED INTER-USER-EQUIPMENT COORDINATION

(71) Applicant: QUALCOMM Incorporated, San Diego, CA (US)

(72) Inventors: Qing Li, Princeton Junction, NJ (US); Junyi Li, Fairless Hills, PA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/343,412

(22) Filed: Jun. 28, 2023

(65) Prior Publication Data
US 2025/0007589 A1     Jan. 2, 2025

(51) Int. Cl.
*H04B 7/06* (2006.01)
*H04B 17/318* (2015.01)
*H04B 17/336* (2015.01)
*H04W 72/231* (2023.01)
*H04W 92/18* (2009.01)

(52) U.S. Cl.
CPC ....... *H04B 7/06952* (2023.05); *H04B 17/318* (2015.01); *H04B 17/336* (2015.01); *H04W 72/231* (2023.01); *H04W 92/18* (2013.01)

(58) Field of Classification Search
None
See application file for complete search history.

(56) References Cited

U.S. PATENT DOCUMENTS 11,616,562 B1   3/2023   Pratas et al.
2025/0142604 A1*   5/2025   Hu ............... H04W 72/121

OTHER PUBLICATIONS

International Search Report and Written Opinion—PCT/US2024/031900—ISA/EPO—Oct. 2, 2024.
Nokia, et al., "On Beam Management for Sidelink in FR2", 3GPP TSG RAN WG1 #113, R1-2304344, 3rd Generation Partnership Project, Mobile Competence Centre, 650, Route Des Lucioles, F-06921 Sophia-Antipolis Cedex, France, vol. RAN WG1, No. Incheon, Korea, May 22, 2023-May 26, 2023, May 15, 2023, 30 Pages, XP052384948, p. 9, paragraph section 2.2.1.1—p. 12, figures 4-6.

(Continued)

*Primary Examiner* — Minh Trang T Nguyen
(74) *Attorney, Agent, or Firm* — Kevin M. Donnelly; Harrity & Harrity, LLP

(57) ABSTRACT

Various aspects of the present disclosure generally relate to wireless communication. Some aspects involve enhancing an inter-user-equipment coordination (IUC) framework to enable user equipment (UE) to perform beam sweeping over the sidelink. Some aspects more specifically relate to fine-tuning beams, such as transmit beams or receive beams, using one or more IUC requests. In some aspects, multiple transmit beams or multiple receive beams may carry respective IUC requests and associated beam signals. In some aspects, one transmit beam or one receive beam may carry an IUC request and associated beam signal, multiple remaining transmit beams or receive beams may carry associated beam signals, and the transmit UE or the receive UE may identify a fine-tuned transmit beam or a fine-tuned receive beam responsive to, based on, or otherwise associated with the IUC request and associated beam signals.

20 Claims, 16 Drawing Sheets

(56) References Cited

OTHER PUBLICATIONS

Qualcomm Incorporated: "Enhanced Sidelink Operation on FR2 Licensed Spectrum", 3GPP TSG RAN WG1 Meeting #113, R1-2305340, 3rd Generation Partnership Project, Mobile Competence Centre, 650, Route Des Lucioles, F-06921 Sophia-Antipolis Cedex, France, vol. RAN WG1, No. Incheon, Korea, May 22, 2023-May 26, 2023, May 13, 2023, 27 Pages, XP052375782, p. 2-p. 9, figures 1-5.

* cited by examiner

BEAM-ASSOCIATED INTER-USER-EQUIPMENT COORDINATION

FIELD OF THE DISCLOSURE

Aspects of the present disclosure generally relate to wireless communication and specifically, to techniques and apparatuses for beam-associated inter-user-equipment coordination.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables user equipment (UE) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Sidelink transmissions between UEs may be impaired due to, for example, hidden nodes and beam misalignment. With respect to hidden nodes, a transmit UE may transmit sidelink control information (SCI) with a physical sidelink shared channel (PSSCH) via a transmit beam paired with a receive UE. Being transmitted via the transmit beam, the SCI is spatially filtered (or spatially isolated) in the direction of the transmission of the receive UE. For example, rather than broadcasting the SCI, the transmit UE may transmit the SCI within a narrow angular range that is associated with the transmission of the transmit UE.

Therefore, hidden nodes (for example, other UEs) may not detect the SCI, which may impact sensing performance of the hidden nodes. For example, another UE may not sense the SCI and, thus, may select resources for a transmission from the other UE such that the transmission collides with a transmission from the transmit UE. As a result, the receive UE may experience strong interference due to the transmission from the other UE and may be unable to detect or decode the transmission from the transmit UE.

With respect to beam misalignment, the transmit and receive UEs may be capable of dual mobility (for example, movement with respect to each other). Dual mobility may include rotation of one or both UEs or relative displacement between the transmit and receive UEs. Rotation can cause active beams (for example, the current paired transmit beam over which the transmit UE sends transmissions, or the current paired receive beam over which the receive UE receives transmissions) to become misaligned. For example, the transmit beam may rotate away from the direction of the receive UE, or the receive beam may rotate away from the direction of the transmit UE. Additionally or alternatively, relative displacement between the transmit and receive UEs may cause the active beams to become misaligned. Misaligned beams can render the receive UE unable to detect or decode sidelink transmissions from the transmit UE.

SUMMARY

Some aspects described herein relate to a user equipment (UE) for wireless communication. The UE may include a processing system that includes one or more processors and one or more memories coupled with the one or more processors. The processing system may be configured to cause the UE to transmit, via a set of one or more transmit beams according to a beam sweeping pattern, a plurality of beam signals associated with at least one inter-UE coordination (IUC) request that includes an indication to perform one or more sensing operations for a transmission of a sidelink communication or one or more resource selection operations for the transmission of the sidelink communication. The processing system may be configured to cause the UE to receive IUC information, associated with the at least one IUC request, that includes at least one of an indication of a resource set type, an indication of one or more resources associated with the resource set type, or an indication of a target beam associated with measurements of the plurality of beam signals.

Some aspects described herein relate to a UE for wireless communication. The UE may include a processing system that includes one or more processors and one or more memories coupled with the one or more processors. The processing system may be configured to cause the UE to receive, via a set of one or more receive beams according to a beam sweeping pattern, a plurality of beam signals associated with at least one IUC request that includes an indication to perform one or more sensing operations for a transmission of a sidelink communication or one or more resource selection operations for the transmission of the sidelink communication. The processing system may be configured to cause the UE to determine a target beam associated with measurements of the plurality of beam signals. The processing system may be configured to cause the UE to perform the one or more sensing operations or the one or more resource selection operations, wherein the one or more sensing operations or the one or more resource selection operations are associated with the target beam.

Some aspects described herein relate to a method for wireless communication by a UE. The method may include transmitting, via a set of one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication. The method may include receiving IUC information, associated with the at least one IUC request, that includes at least one of an indication of a resource set type, an indication of one or more resources associated with the resource set type, or an indication of a target beam associated with measurements of the plurality of beam signals.

Some aspects described herein relate to a method for wireless communication by a UE. The method may include receiving, via a set of one or more receive beams according to a beam sweeping pattern, a plurality of beam signals associated with at least one IUC request that includes an indication to perform one or more sensing operations for a transmission of a sidelink communication or one or more resource selection operations for the transmission of the sidelink communication. The method may include determining a target beam associated with measurements of the plurality of beam signals. The method may include performing the one or more sensing operations or the one or more resource selection operations, wherein the one or more sensing operations or the one or more resource selection operations are associated with the target beam.

Some aspects described herein relate to a non-transitory computer-readable medium that stores a set of instructions for wireless communication by a UE. The set of instructions, when executed by one or more processors of the UE, may cause the UE to transmit, via a set of one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication. The set of instructions, when executed by the one or more processors of the UE, may cause the UE to receive IUC information, associated with the at least one IUC request, that includes at least one of an indication of a resource set type, an indication of one or more resources associated with the resource set type, or an indication of a target beam associated with measurements of the plurality of beam signals.

Some aspects described herein relate to a non-transitory computer-readable medium that stores a set of instructions for wireless communication by a UE. The set of instructions, when executed by one or more processors of the UE, may cause the UE to receive, via a set of one or more receive beams according to a beam sweeping pattern, a plurality of beam signals associated with at least one IUC request that includes an indication to perform one or more sensing operations for a transmission of a sidelink communication or one or more resource selection operations for the transmission of the sidelink communication. The set of instructions, when executed by one or more processors of the UE, may cause the UE to determine a target beam associated with measurements of the plurality of beam signals. The set of instructions, when executed by one or more processors of the UE, may cause the UE to perform the one or more sensing operations or the one or more resource selection operations, wherein the one or more sensing operations or the one or more resource selection operations are associated with the target beam.

Some aspects described herein relate to an apparatus for wireless communication. The apparatus may include means for transmitting, a set of via one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication. The apparatus may include means for receiving IUC information, associated with the at least one IUC request, that includes at least one of an indication of a resource set type, an indication of one or more resources associated with the resource set type, or an indication of a target beam associated with measurements of the plurality of beam signals.

Some aspects described herein relate to an apparatus for wireless communication. The apparatus may include means for receiving, via a set of one or more receive beams according to a beam sweeping pattern, a plurality of beam signals associated with at least one IUC request that includes an indication to perform one or more sensing operations for a transmission of a sidelink communication or one or more resource selection operations for the transmission of the sidelink communication. The apparatus may include means for determining a target beam associated with measurements of the plurality of beam signals. The apparatus may include means for performing the one or more sensing operations or the one or more resource selection operations, wherein the one or more sensing operations or the one or more resource selection operations are associated with the target beam.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
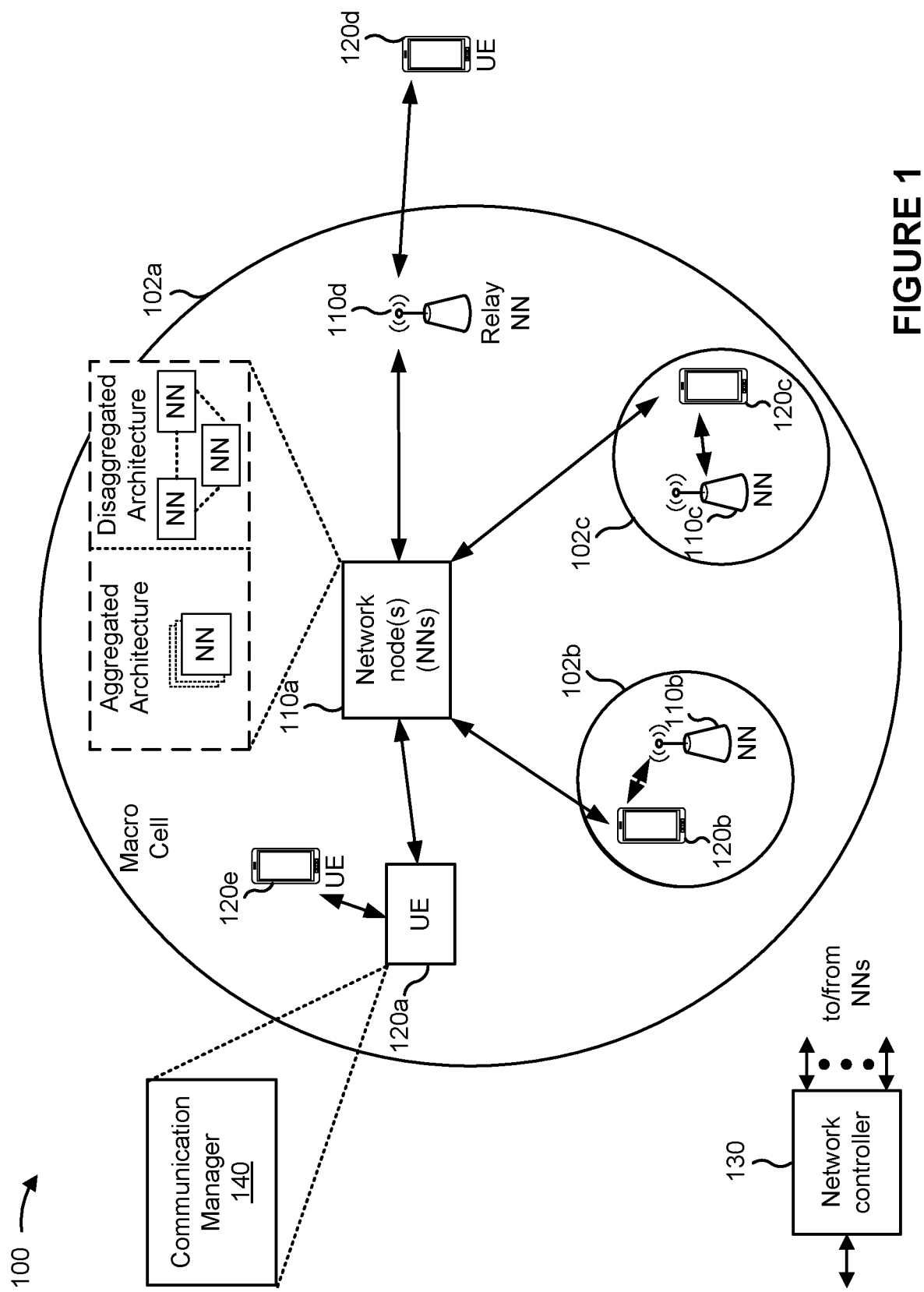
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to enhancing an inter-user-equipment (inter-UE) coordination (IUC) framework to enable UEs to perform beam sweeping over sidelinks. Some aspects more specifically relate to fine-tuning beams (for example, transmit beams or receive beams) using one or more IUC requests. In some aspects, multiple transmit beams or multiple receive beams may carry respective IUC requests and associated beam signals. In some aspects, one transmit beam or one receive beam may carry an IUC request and an associated beam signal, multiple remaining transmit beams or receive beams may carry associated beam signals, and the transmit UE or the receive UE may identify a fine-tuned transmit beam or a fine-tuned receive beam responsive to, based on, or otherwise associated with the IUC request and associated beam signals.

Particular aspects of the subject matter described in this disclosure can be implemented to realize one or more of the following potential advantages. In some examples, the described techniques can be used to mitigate impairment of a transmission from a transmit UE to a receive UE. For example, by fine-tuning the transmit beam or the receive beam, the transmit UE or the receive UE may reduce interference due to transmissions from hidden nodes or limit the impact of beam misalignment due to dual mobility. For example, fine-tuning the receive beam may help to protect the receive UE from potentially interfering transmissions from hidden nodes. Fine-tuning the transmit beam or the receive beam may enable the transmit UE or the receive UE to re-align the transmit beam or the receive beam (for example, in case the transmit beam or the receive beam becomes misaligned). As a result, fine-tuning beams as described herein may reduce a power consumption for the transmit UE or the receive UE (for example, due to fewer retransmissions as a result of fewer collisions or misaligned beams).

In some aspects, transmitting multiple IUC requests via respective transmit beams, or receiving multiple IUC requests via respective receive beams, may help to ensure that the receive UE successfully decodes the IUC request (for example, in the event of high UE mobility or frequent motions such that beam misalignment may be severe) and can thereby identify a fine-tuned transmit beam or a fine-tuned receive beam responsive to, based on, or otherwise associated with the IUC requests. In some aspects, transmitting one IUC request via a transmit beam or receiving one IUC request via a receive beam (for example, in the event of low UE mobility or less frequent motions such that beam misalignment may be moderate), may reduce overhead relative to transmitting multiple IUC requests via respective transmit beams or receiving multiple IUC requests via respective receive beams.

FIG. 1 is a diagram illustrating an example of a wireless network in accordance with the present disclosure. The wireless network 100 may be or may include elements of a 5G (for example, New Radio (NR)) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120c) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). Although a portion of FR1 is greater than 6 GHZ, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ), FR4 (52.6 GHZ-114.25 GHz), and FR5 (114.25 GHZ-300 GHz). Each of these higher frequency bands falls within the EHF band.

With the above examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, via a set of one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication; and receive IUC information, associated with the at least one IUC request, that includes at least one of an indication of a resource set type, an indication of one or more resources associated with the resource set type, or an indication of a target beam associated with measurements of the plurality of beam signals. Additionally or alternatively, the communication manager 140 may perform one or more other operations described herein.

In some aspects, as described in more detail elsewhere herein, the communication manager 140 may receive, via a set of one or more receive beams according to a beam sweeping pattern, a plurality of beam signals associated with at least one IUC request that includes an indication to perform one or more sensing operations for a transmission of a sidelink communication or one or more resource selection operations for the transmission of the sidelink communication; determine a target beam associated with measurements of the plurality of beam signals; and perform the one or more sensing operations or the one or more resource selection operations, wherein the one or more sensing operations or the one or more resource selection operations are associated with the target beam. Additionally or alternatively, the communication manager 140 may perform one or more other operations described herein.

Figure 2:
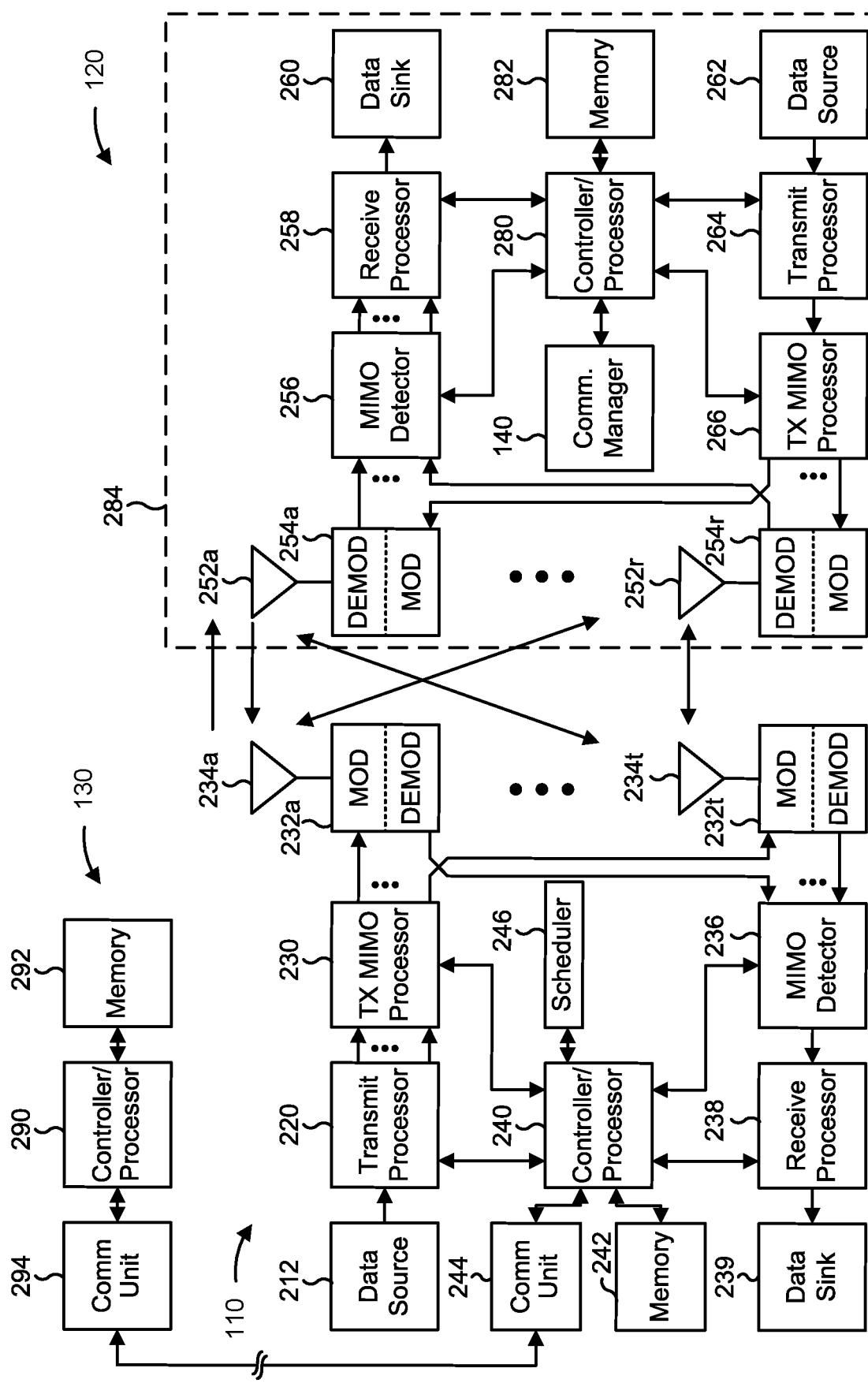
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream.

Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with beam-associated IUC, as described in more detail elsewhere herein. For example, the controller/processor 240 of the network node 110, the controller/processor 280 of the UE 120, or any other component(s) of FIG. 2 may perform or direct operations of, for example, process 1300 of FIG. 13, process 1400 of FIG. 14, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1300 of FIG. 13, process 1400 of FIG. 14, or other processes as described herein. In some examples, executing instructions may include running the instructions, converting the instructions, compiling the instructions, or interpreting the instructions, among other examples.

In some aspects, the UE 120 includes means for transmitting, via a set of one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication; and/or means for receiving IUC information, associated with the at least one IUC request, that includes at least one of an indication of a resource set type, an indication of one or more resources associated with the resource set type, or an indication of a target beam associated with measurements of the plurality of beam signals. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving, via a set of one or more receive beams according to a beam sweeping pattern, a plurality of beam signals associated with at least one IUC request that includes an indication to perform one or more sensing operations for a transmission of a sidelink communication or one or more resource selection operations for the transmission of the sidelink communication; means for determining a target beam associated with measurements of the plurality of beam signals; and/or means for performing the one or more sensing operations or the one or more resource selection operations, wherein the one or more sensing operations or the one or more resource selection operations are associated with the target beam. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
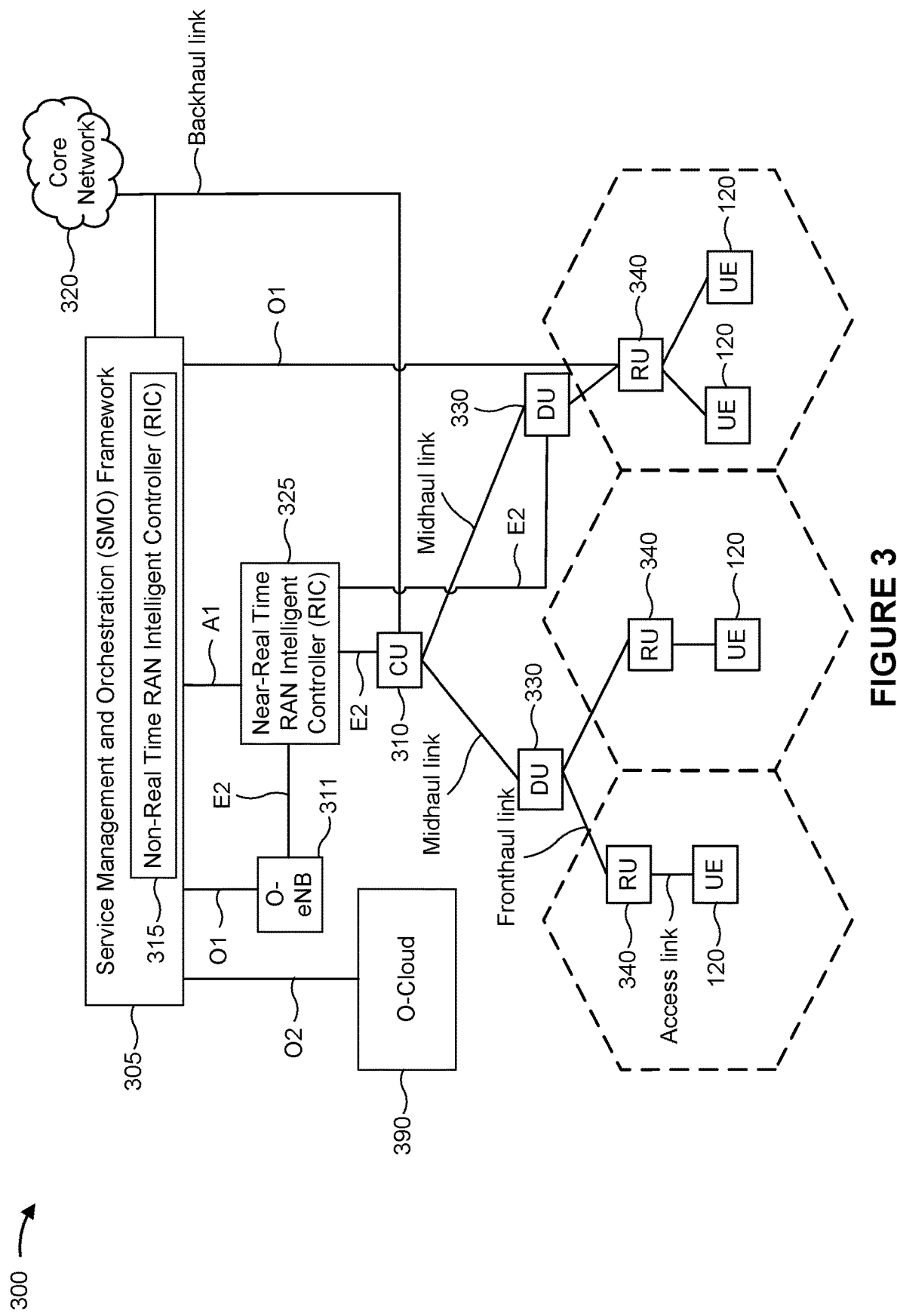
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on or otherwise associated with a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
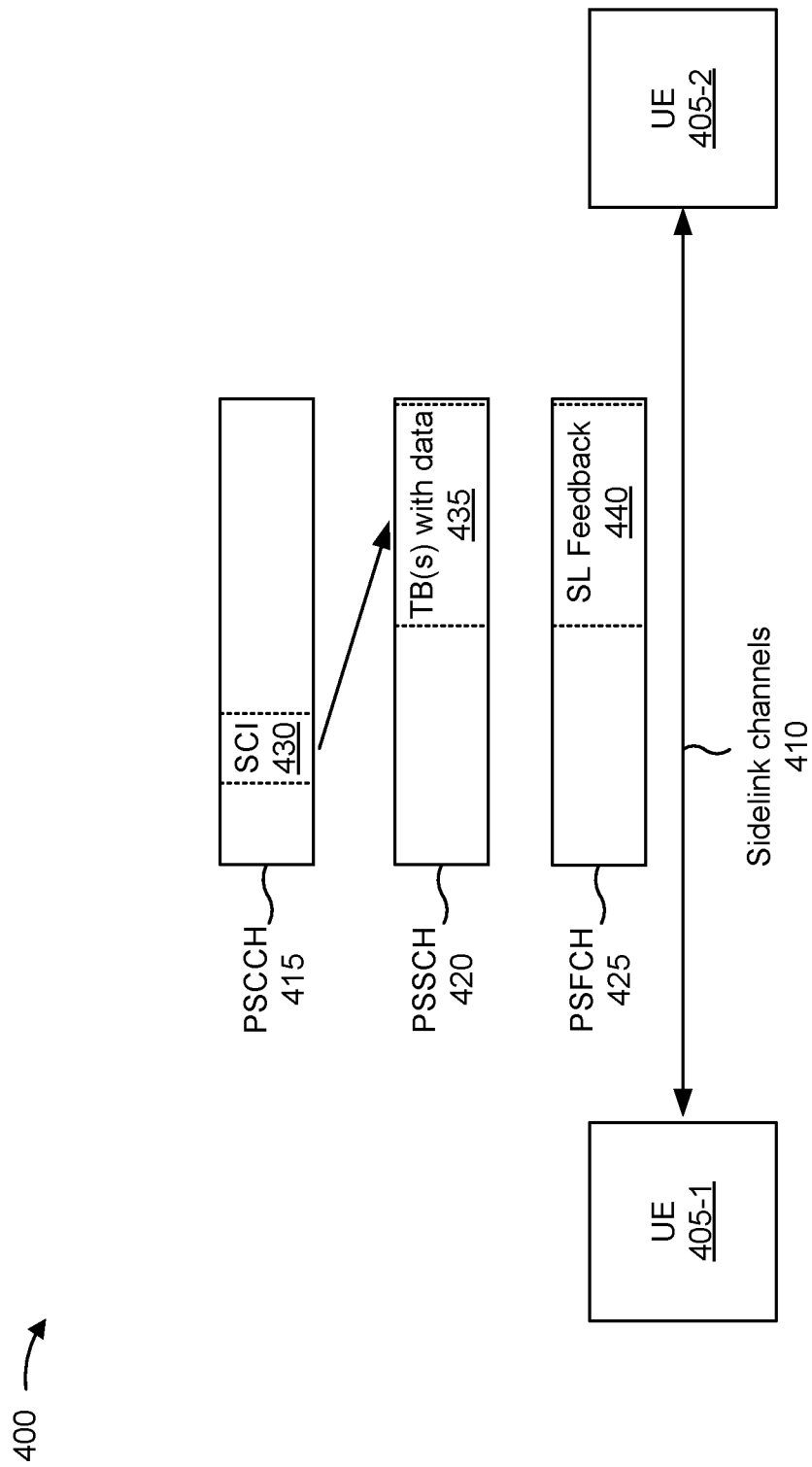
FIG. 4 is a diagram illustrating an example of sidelink communications in accordance with the present disclosure.

FIG. 4 is a diagram illustrating an example of sidelink communications 400 in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (for example, which may include V2V communications, V2I communications, and/or V2P communications) or mesh networking. In some aspects, the UEs 405 (for example, UE 405-1 or UE 405-2) may correspond to one or more other UEs described elsewhere herein, such as UE 120. In some aspects, the one or more sidelink channels 410 may use a PC5 interface and/or may operate in a high frequency band (for example, the 5.9 GHZ band). Additionally or alternatively, the UEs 405 may synchronize timing of transmission time intervals (TTIs) (for example, frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (for example, time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (for example, acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (for example, time resources, frequency resources, and/or spatial resources) on the PSSCH 420, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, a UE 405 may operate using a sidelink resource allocation mode (for example, Mode 1) where resource selection and/or scheduling is performed by a network node 110 (for example, a base station, a CU, or a DU). For example, the UE 405 may receive a grant (for example, in downlink control information (DCI) or in a RRC message, such as for configured grants) from the network node 110 (for example, directly or via one or more network nodes) for sidelink channel access and/or scheduling. In some aspects, a UE 405 may operate using a resource allocation mode (for example, Mode 2) where resource selection and/or scheduling is performed by the UE 405 (for example, rather than a network node 110). In some aspects, the UE 405 may perform resource selection and/or scheduling by sensing channel availability for transmissions. For example, the UE 405 may measure a received signal strength indicator (RSSI) parameter (for example, a sidelink-RSSI (S-RSSI) parameter) associated with various sidelink channels, may measure a reference signal received power (RSRP) parameter (for example, a PSCCH-RSRP or PSSCH-RSRP parameter) associated with various sidelink channels, and/or may measure a reference signal received quality (RSRQ) parameter (for example, a PSCCH-RSRQ or PSSCH-RSRQ parameter) associated with various sidelink channels, and may select a channel for transmission of a sidelink communication based at least in part on the measurement(s).

Additionally or alternatively, the UE 405 may perform resource selection and/or scheduling using SCI 430 received in the PSCCH 415, which may indicate reserved resources and/or channel parameters. Additionally or alternatively, the UE 405 may perform resource selection and/or scheduling by determining a channel busy ratio (CBR) associated with various sidelink channels, which may be used for rate control (for example, by indicating a maximum number of resource blocks that the UE 405 can use for a particular set of subframes).

In the resource allocation mode where resource selection and/or scheduling is performed by a UE 405 (Mode 2), the UE 405 may generate sidelink grants, and may transmit the grants in SCI 430. A sidelink grant may indicate, for example, one or more parameters (for example, transmission parameters) to be used for a sidelink transmission, such as one or more resource blocks to be used for the upcoming sidelink transmission on the PSSCH 420 (for example, for TBs 435), one or more slots to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally or alternatively, the UE 405 may generate a sidelink grant for event-driven scheduling, such as for an on-demand sidelink message.

FR2 may support sidelink operation, such as sidelink beam management for unicast communications. For example, FR2 may support initial beam-pairing, beam maintenance, or beam failure recovery, among other examples. Sidelink communications (for example, FR2 sidelink communication) are transmitted on a per-slot basis. For example, each sidelink transmission may occupy one full slot.

Figure 5:
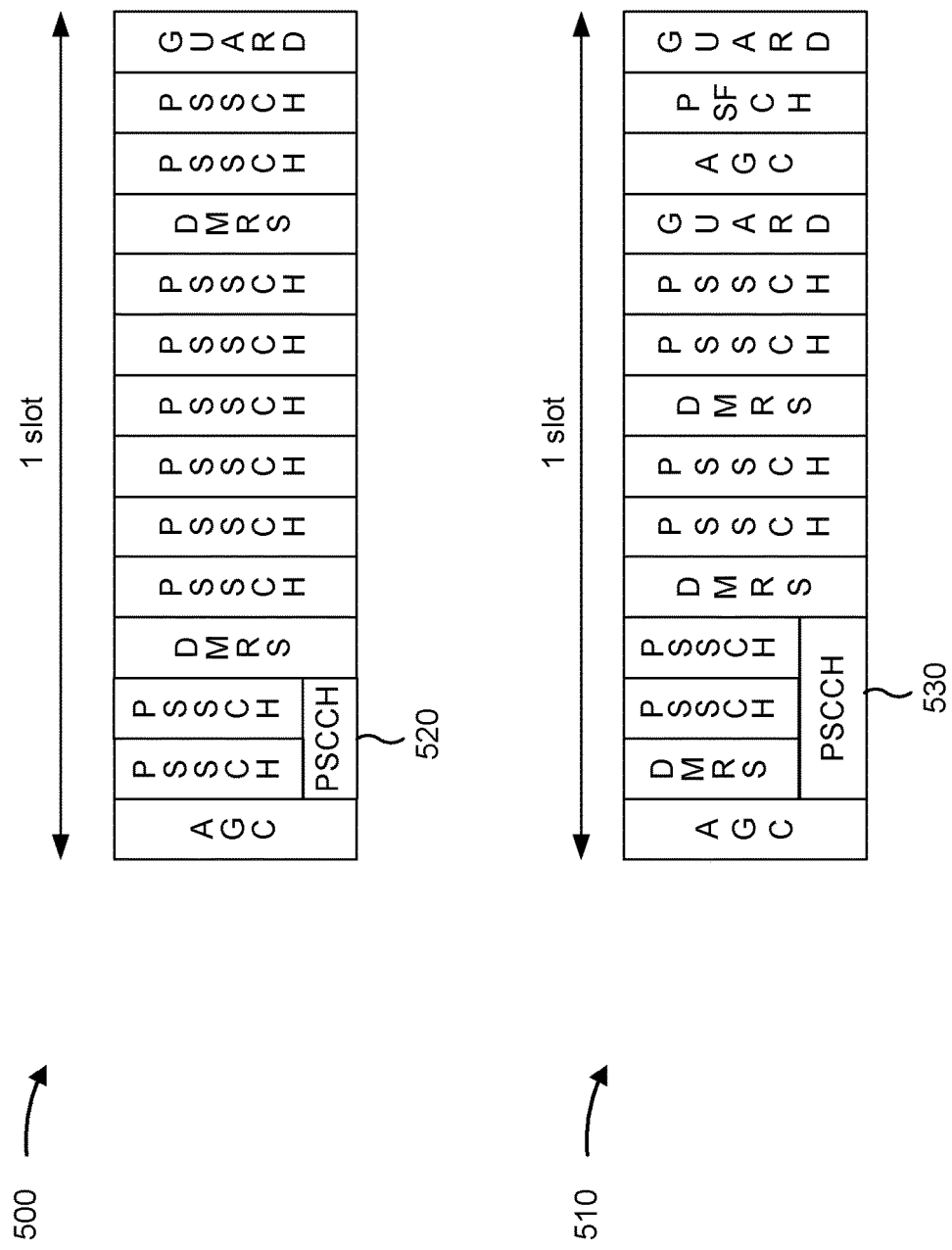
FIG. 5 is a diagram illustrating examples of New Radio (NR) sidelink slot formats in accordance with the present disclosure.

FIG. 5 is a diagram illustrating examples of NR sidelink slot formats 500 and 510 in accordance with the present disclosure. NR sidelink slot formats 500 and 510 each contain 14 symbols, including automatic gain control (AGC) symbols, PSSCH symbols, DMRS symbols, and guard symbols. NR sidelink slot format 500 includes a two-symbol SCI on PSCCH 520, and NR sidelink slot format 510 includes a three-symbol SCI on PSCCH 530.

The two-symbol or three-symbol SCI may be a first-stage SCI transmitted with a PSSCH by a transmit UE. The two-symbol or three-symbol SCI may indicate resources (for example, time or frequency resources) that are reserved for future transmissions that the transmit UE may transmit over a PSSCH. For SPS, the resource reservation period field of the two-symbol or three-symbol SCI may indicate a time interval for periodic future transmissions.

The two-symbol or three-symbol SCI may enable UEs to select one or more resources by performing sidelink sensing. For example, a transmit UE may broadcast an indication of the reserved resources in the two-symbol or three-symbol SCI. Other transmit UEs that are conducting sensing for resource selection may decode the broadcasted two-symbol or three-symbol SCI and exclude one or more of the resources reserved by the transmit UE. For example, one or more of the other transmit UEs may avoid transmitting in one or more of the reserved resources, which may reduce interference among transmit UEs.

Figure 6:
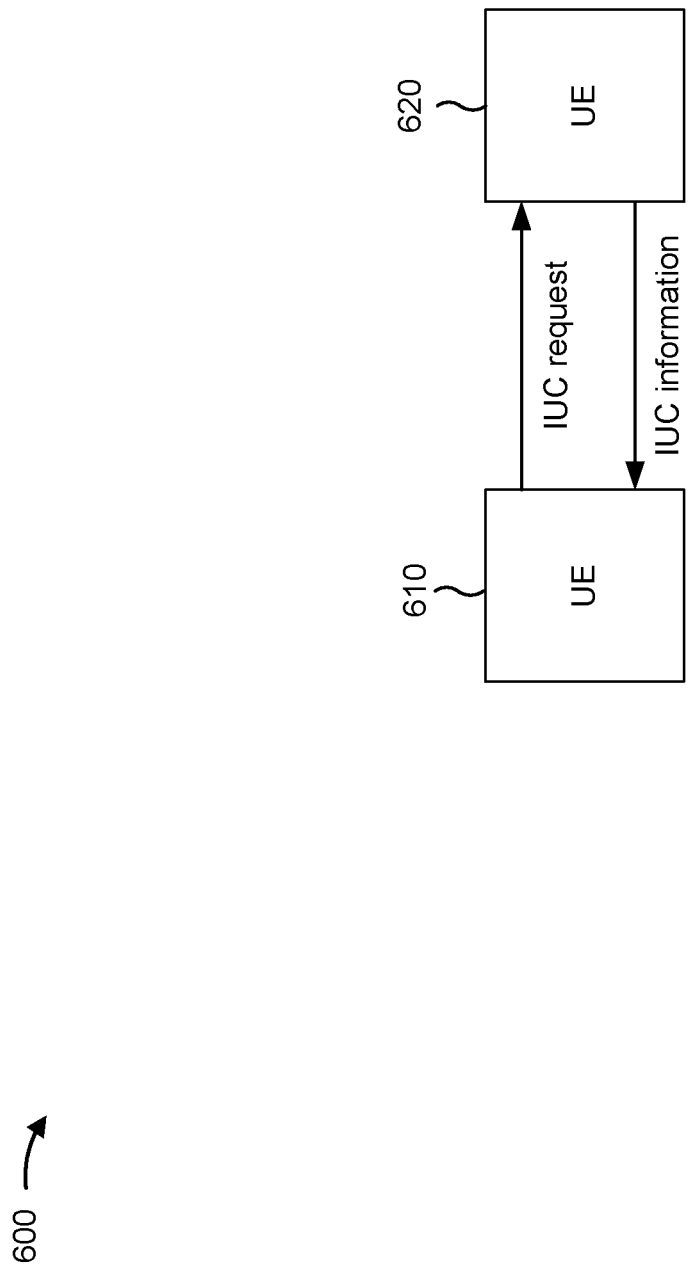
FIG. 6 is a diagram illustrating an example of a coordination signaling environment in accordance with the present disclosure.

FIG. 6 is a diagram illustrating an example of a coordination signaling environment 600 in accordance with the present disclosure.

In coordination signaling environment 600, a UE 610 (for example, UE 120*a* of FIG. 1) exchanges IUC signaling with a UE 620 (for example, UE 120*e* of FIG. 1). The UE 610 and the UE 620 may operate in an in-coverage mode, a partial coverage mode, or an out-of-coverage mode with a network node 110. The UE 610 may be referred to as a transmit UE, and the UE 620 may be referred to as a receive UE.

The UE 610 may transmit, in a MAC control element (MAC-CE) or an SCI-2 in a PSSCH, an IUC request. The IUC request may include an indication of a resource selection window, an indication of a resource set type (for example, a preferred or non-preferred resource set), an indication of a layer 1 priority associated with the IUC request, a quantity of sub-channels to be used for a PSSCH/PSCCH transmission, or a resource reservation period for the preferred or non-preferred resource set, among other examples.

The UE 620 may receive the IUC request from the UE 610. The UE 620 may conduct sensing and resource selection responsive to, based on, or otherwise associated with the IUC request. For example, the UE 620 may determine a set of sidelink resources to be used for a sidelink transmission (for example, preferred resources) or a set of sidelink resources not to be used for a sidelink transmission (for example, non-preferred resources). The UE 620 may determine the set of sidelink resources responsive to, based on, or otherwise associated with a sensing operation, which may be performed by the UE 620 responsive to, based on, or otherwise associated the received IUC request.

The UE 620 may transmit, in a MAC-CE or an SCI-2 in a PSSCH, IUC information. The UE 620 may transmit the IUC information while operating in NR sidelink resource allocation mode 2. In NR sidelink resource allocation mode 2, resource allocation is handled by UEs (for example, in comparison to NR sidelink resource allocation mode 1, in which resource allocation is handled by a scheduling entity, such as a network node 110).

The IUC information may include an indication of the resource set type (for example, the preferred or non-preferred source set), an indication of a location of a reference slot, or an indication of time and frequency resources (for example, available resources), among other examples. The IUC information may also be referred to as an IUC message.

The IUC information may identify resources that are preferred by the UE 620 for transmissions by the UE 610. Alternatively, the indication of the set of available resources may identify resources that are not preferred by the UE 620 for transmissions by the UE 610 (for example, with the available resources being those other than the resources that are preferred).

The UE 610 may receive the IUC information and, responsive to, based on, or otherwise associated with the IUC information, select a sidelink resource for a transmission from the UE 610 based at least in part on the set of preferred or non-preferred resources indicated by the UE 620. The UE 610 may account for the IUC information when transmitting the transmission. For example, the UE 610 may transmit the transmission via a sidelink resource included in the resources indicated as preferred resources by the IUC information. In another example, the UE 610 may transmit the transmission via a resource not included in the sidelink resources indicated as non-preferred resources by the IUC information. The IUC information related to resource allocation may reduce transmission collisions between the UE 610 and other UEs (for example, hidden nodes).

Although FIG. 6 shows a single UE 620 transmitting IUC information to a single UE 610, in some aspects, a single UE 620 may transmit IUC information to multiple UEs to assist those UEs with selecting resources for transmissions. Additionally or alternatively, the UE 610 may receive IUC information from multiple UEs, and may use that information to select resources for a transmission (for example, resources that avoid a conflict with all of the multiple UEs, or as many as UEs possible).

Figure 7:
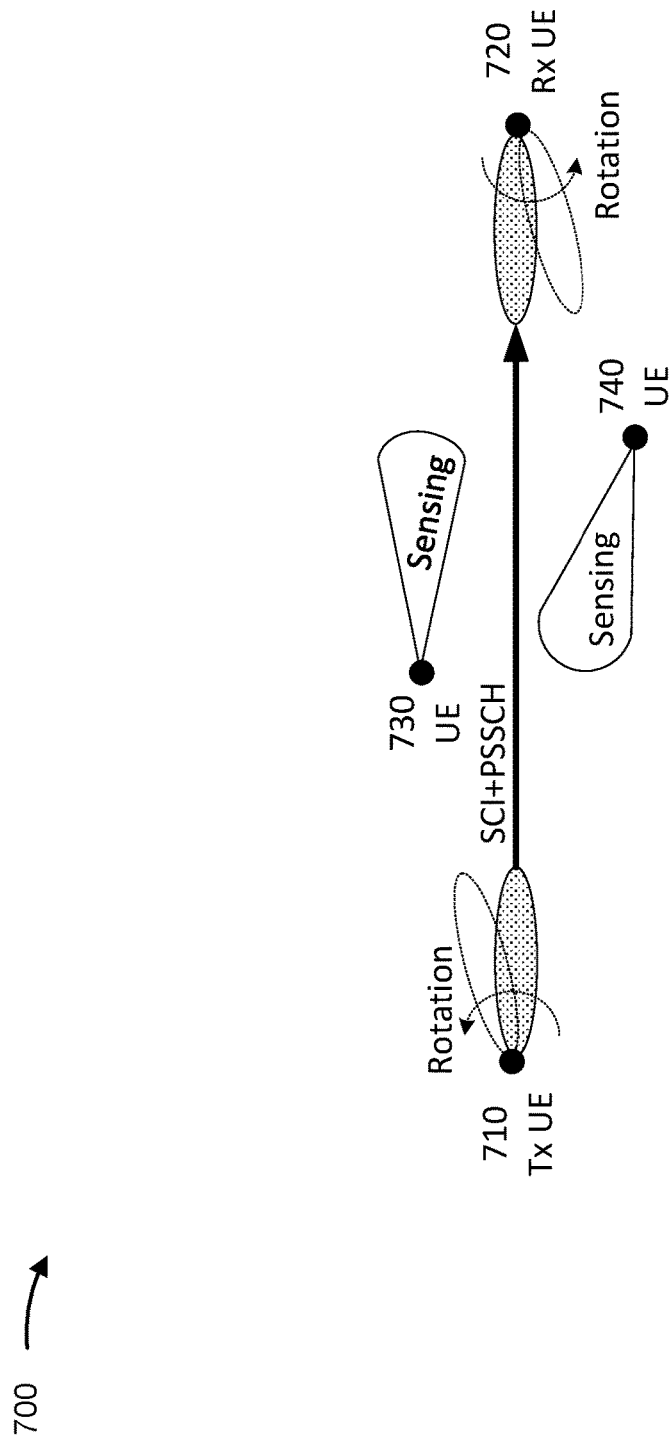
FIG. 7 is a diagram illustrating an example environment in which sidelink transmissions are impaired in accordance with the present disclosure.

FIG. 7 is a diagram illustrating an example environment 700 in which sidelink transmissions are impaired in accordance with the present disclosure.

Environment 700 includes UEs 710-740. UE 710 may be a transmit UE, and UE 720 may be a receive UE. The UE 710 may be configured to transmit a sidelink communication over one or more transmit beams, and the UE 720 may be configured to receive a sidelink communication over one or more receive beams. For sidelink unicast transmissions on FR2, the UE 710 may transmit an SCI with a PSSCH. For example, the UE 710 may transmit a two-symbol or three-symbol SCI in a slot as described above in connection with FIG. 5. The SCI may indicate one or more resources reserved by the UE 710.

Transmissions from the UE 710 to the UE 720 may be impaired in environment 700 due to at least hidden nodes and/or beam misalignment. With respect to hidden nodes, the UE 710 may transmit the SCI with the PSSCH via a transmit beam paired with the UE 720. Being transmitted via the transmit beam, the SCI is spatially filtered (or spatially isolated) in the direction of the transmission of the UE 710. For example, rather than broadcasting the SCI, the UE 710 may transmit the SCI within a narrow angular range which is associated with the transmission of the UE 710.

Therefore, hidden nodes (for example, UE 730 or UE 740) may not detect the SCI, which may impact sensing performance. For example, the UE 730 may not sense the SCI and, thus, select resources for a transmission from the UE 730 such that the transmission from the UE 730 collides with the transmission from the UE 710. As a result, the UE 720 may experience strong interference due to the transmission from the UE 730 and may be unable to detect or decode the transmission from the UE 710.

With respect to beam misalignment, the UEs 710 and 720 may be capable of dual mobility (for example, movement with respect to each other). Dual mobility may include rotation or relative displacement between the UEs 710 and 720. As shown in FIG. 7, rotation can cause active beams (for example, the current transmit beam paired with UE 720 over which the UE 710 sends transmissions and the current receive beam paired with UE 710 over which the UE 720 is configured to receive transmissions) to become misaligned. For example, the transmit beam may rotate away from the direction of the UE 720, or the receive beam may rotate away from the direction of the UE 710. Additionally or alternatively, relative displacement between the UE 710 and the UE 720 may cause the active beams or paired beams to become misaligned. Misaligned beams can render the UE 720 unable to detect or decode the transmission from the UE 710.

Various aspects relate generally to enhancing an IUC framework (for example, the IUC framework described above in relation to FIG. 6) to enable UEs to perform beam sweeping over the sidelink. Some aspects more specifically relate to fine-tuning beams (for example, transmit beams or receive beams) using one or more IUC requests. In some aspects, multiple transmit beams may transmit or multiple receive beams May receive respective IUC requests and associated beam signals. In some aspects, one transmit beam may transmit or one receive beam may receive an IUC request and an associated beam signal, multiple remaining transmit beams may transmit or multiple remaining receive beams may receive associated other beam signals, and the transmit UE or the receive UE may identify a fine-tuned transmit beam or a fine-tuned receive beam responsive to, based on, or otherwise associated with the IUC request and associated beam signals.

Particular aspects of the subject matter described in this disclosure can be implemented to realize one or more of the following potential advantages. In some examples, the described techniques can be used to mitigate impairment of a transmission from a transmit UE to a receive UE. For example, by fine-tuning the transmit beam or the receive beam, the transmit UE or the receive UE may reduce interference due to transmissions from hidden nodes or limit the impact of beam misalignment due to dual mobility. For example, fine-tuning the receive beam may help to prevent the receive UE from detecting potentially interfering transmissions from hidden nodes. Fine-tuning the transmit beam or the receive beam may enable the transmit UE or the receive UE to re-align the transmit beam or the receive beam (for example, in case the transmit beam or the receive beam becomes misaligned). As a result, fine-tuning beams as described herein may reduce a power consumption for the transmit UE or the receive UE (for example, due to fewer retransmissions as a result of fewer collisions or misaligned beams).

In some aspects, transmitting multiple IUC requests via respective transmit beams, or receiving multiple IUC requests via respective receive beams, may help to ensure that the receive UE successfully decodes the IUC request and can thereby identify a fine-tuned transmit beam or a fine-tuned receive beam responsive to, based on, or otherwise associated with the IUC requests. In some aspects, transmitting one IUC request via a transmit beam, or receiving one IUC request via a receive beam, may reduce overhead relative to transmitting multiple IUC requests via respective transmit beams or receiving multiple IUC requests via respective receive beams.

Figure 8:
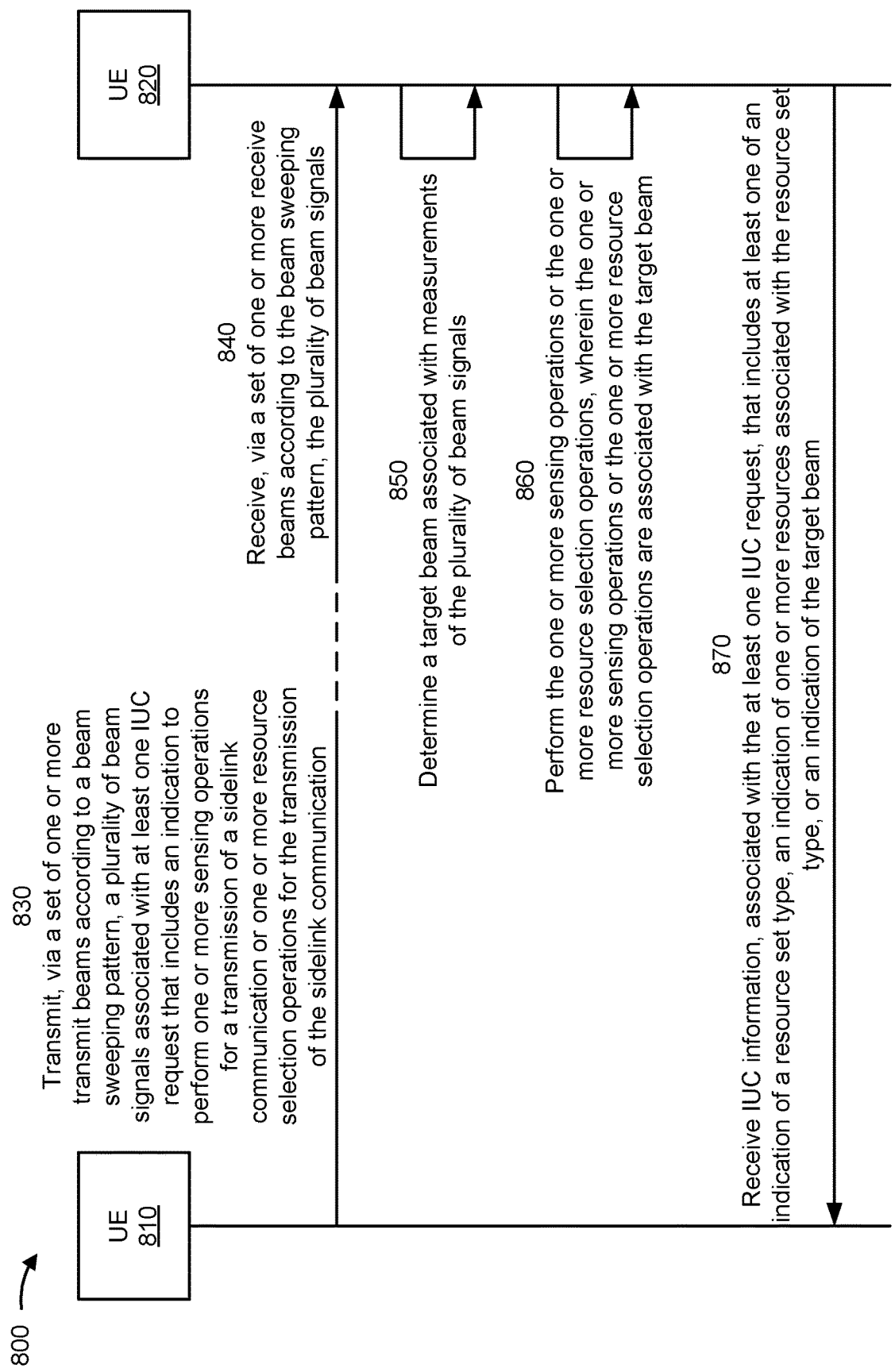
FIG. 8 is a diagram illustrating an example associated with beam-associated inter-UE coordination (IUC) in accordance with the present disclosure.

FIG. 8 is a diagram illustrating an example 800 associated with beam-associated IUC in accordance with the present disclosure. As shown in FIG. 8, a UE 810 (for example, UE 120a) and a UE 820 (for example, UE 120e) may communicate with one another over the sidelink. The UE 810 may be referred to as a transmit UE, and the UE 810 may be referred to as a receive UE.

In a first operation 830, the UE 810 transmits, via a set of one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication. As described in greater detail below with reference to FIG. 9, the UE 810 may transmit the plurality of beam signals over multiple transmit beams in accordance with a transmit beam sweeping pattern (for example, transmit beam fine tuning). As described in greater detail below with reference to FIG. 10, the UE 810 may transmit the plurality of beam signals over one transmit beam in accordance with a receive beam sweeping pattern (for example, receive beam fine tuning).

In a second operation 840, the UE 820 receives, via a set of one or more receive beams, the plurality of beam signals according to the beam sweeping pattern. As described in greater detail below with reference to FIG. 9, the UE 820 may receive the plurality of beams over one receive beam in accordance with a transmit beam sweeping pattern (for example, transmit beam fine tuning). As described in greater detail below with reference to FIG. 10, the UE 820 may receive the plurality of beams over multiple receive beams in accordance with a receive beam sweeping pattern (for example, receive beam fine tuning).

As described in greater detail below with reference to FIGS. 9 and 10, the UE 810 may transmit, and the UE 820 may receive, multiple IUC requests (for example, one IUC request for each beam signal). Additionally or alternatively, the UE 810 may transmit, and the UE 820 may receive, one IUC request (for example, one IUC request carried on the active beam with an associated beam signal).

In some aspects, the plurality of beam signals is associated with one or more sequences that are mapped continuously to frequency resources. For example, the beam signals may be associated with a sequence or a combination of sequences (for example, one or more m-sequences) that are mapped continuously in frequency resources (for example, continuously over resource elements or continuously over subcarriers, similar to a PSS or SSS in an NR synchronization signal block (SSB)). Information relating to the beam may be used to generate the sequence. For example, the beam identifier or index, the beam signal configuration identifier, index, or indication, the beam transmission configuration indicator (TCI) state, may be used to determine the m-sequence (for example, similar to $N_{ID}$ for PSS or SSS sequence x(m) generation).

In some aspects, the plurality of beam signals is associated with one or more sequences that are mapped discontinuously to frequency resources. For example, the beam signals may be associated with a pseudo-random sequence or a combination of sequences that are mapped discontinuously in frequency resources. For example, the sequence(s) may be in a comb structure or comb-like mapping such as a mapping to one or multiple resource elements or subcarriers in each of one or more resource blocks (RBs), similar to the NR channel state information reference signal (CSI-RS) where the one or more RBs are based on the density of CSI-RS (for example, in the case of alternating resource blocks CSI-RS density may equal one-half). Information relating to the beam may be used for an initial sequence. For example, the beam signal associated beam identifier or index, the beam signal configuration identifier or index or indication, the beam signal TCI state, or the like may be used for initiating the sequence, similar to nip being used for $C_{int}$ of CSI-RS sequence generation.

In a third operation 850, the UE 820 determines a target beam associated with measurements of the plurality of beam signals. For example, the measurements may include measurements of beam signal received power associated with the plurality of beam signals or measurements of signal-to-interference-plus-noise ratios (SINRs) associated with the plurality of beam signals, among other examples. For example, the UE 820 may obtain a beam signal received power or an SINR for each beam signal. Responsive to, based on, or otherwise associated with the measurements, the UE 820 may identify the target beam, which may be a beam that provides a highest-quality beam signal (for example, as determined by the measurements of beam signal received power or SINR above or below a threshold that may be pre-configured, configured, activated or dynamically indicated to UE 820) of a plurality of beams. For example, the target beam may be a receive beam or a transmit beam identified respectively from among a plurality of receive beams or a plurality of transmit beams.

In a fourth operation 860, the UE 820 may perform the one or more sensing operations or the one or more resource selection operations. The one or more sensing operations or the one or more resource selection operations may be associated with the target beam. For example, the sensing operation(s) may involve the UE 820 attempting to decode (or "sense") SCIs transmitted by other UEs. For example, the UE 820 may detect one or more SCIs indicating that the other UE(s) have reserved resources indicated in the IUC request transmitted by the UE 810. The UE 820 may perform the sensing operation(s) (for example, attempt to detect and decode the one or more SCIs) via a receive beam, such as the target beam (if the target beam is a target receive beam) or a receive beam associated with the target beam (if the target beam is a target transmit beam) based on a beam correspondence between the transmit beam and receive beam.

The resource selection operations may involve the UE 820 selecting resources responsive to, based on, or otherwise associated at least one of the resource selection window, priority, resource reservation period, or resource set type (for example, preferred resource set or non-preferred resource set) as indicated in the SCI transmitted by the UE 810 for a sidelink transmission. For example, the UE 820 may select resources as preferred resources that are not reserved by other UE(s) (for example, exclude resources that are reserved by the other UE(s)). In some examples, the UE 820 may select resources as non-preferred resources that are reserved by other UE(s) (for example, as indicated in the SCIs transmitted by the other UE(s)) or that have high interference (for example, as indicated by the RSSI or CBR measurements being above a threshold for a priority).

In a fifth operation 870, the UE 820 may transmit, and the UE 810 may receive, IUC information, associated with the IUC request, that includes at least one of an indication of resource set type (for example, preferred resource set or non-preferred resource set), an indication of resources associated with the resource set type (for example, time and/or frequency resources that belong to the corresponding resource set), or an indication of the target beam (for example, a target transmit beam or target receive beam associated with measurements of the plurality of beam signals). The indication of the target beam may include beam information, described above, that is associated with the target transmit beam or target receive beam for the transmission or reception of the sidelink communication. The target transmit or receive beam may be associated with the measurements of the plurality of beam signals.

In some aspects, the target beam may be the target beam determined by the UE 820 in the third operation 850. In some aspects, the target beam may be associated with a corresponding beam (for example, based on beam correspondence between a transmit beam and a receive beam). In some aspects, the target beam may be the active beam (for example, in case the beams are well-aligned) and the indicated preferred or non-preferred resources may be associated with the target (active) beam. For example, no beam switching for transmitting and/or receiving the sidelink transmission responsive to, based on, or otherwise associated with the IUC information may occur. In some aspects, the target beam may be different from the active beam (for example, in case the beams are misaligned) and the indicated preferred or non-preferred resources may be associated with the target (non-active). For example, beam switching from the active beam to target beam for transmitting and/or receiving the sidelink transmission responsive to, based on, or otherwise associated with the IUC information may occur.

In some aspects, the IUC information may include an indication of one or more selected resources (for example, preferred resource set or non-preferred resource set), associated with the one or more resource selection operations. For example, the IUC information may include an indication of resources to be included (for example, preferred resources) selected using the target receive beam or the receive beam associated with the target transmit beam responsive to, based on, or otherwise associated with beam correspondence between a transmit beam and a receive beam or an indication of resources to be excluded (for example, non-preferred resources), such as resource reserved by other UE(s) as sensed by the UE 820 using a target receive beam or a receive beam associated with a target transmit beam responsive to, based on, or otherwise associated with beam correspondence between a transmit beam and a receive beam.

The UE 810 may transmit, and the UE 820 may receive, the sidelink communication in the one or more selected resources responsive to, based on, or otherwise associated with the resources indicated in the IUC information. If the target beam is a target transmit beam, the UE 810 may transmit the sidelink communication via the target transmit beam and the UE 820 may receive the sidelink communication via a receive beam associated with the target transmit beam based on beam correspondence. If the target beam is a target receive beam, the UE 810 may transmit the sidelink communication via a transmit beam associated with the target receive beam based on beam correspondence and the UE 820 may receive the sidelink communication via the target receive beam.

Example 800 may mitigate impairment of sidelink communications between UE 810 and UE 820. For instance, example 800 may enable the UEs 810 and 820 to mitigate impairment due to hidden nodes. The UE 820 performing the sensing or resource selection operations associated with the target beam may enable the UE 820 to identify which resources indicated in the IUC request are reserved by other UEs. The UE 810 receiving the IUC information associated with the IUC request may enable the UE 810 to mitigate impairment of the sidelink communication associated with the IUC request. For example, the IUC information including the indication of the target transmit beam may enable the UE 810 to switch to the target transmit beam having better beam alignment.

The IUC information including the indication of the selected resource(s) may enable the UE 810 to identify which resources are to be excluded (for example, non-preferred resources) for transmission (for example, resources have been reserved by other UEs, resources having strong interference, or resources that the UE 820 cannot receive) and, thus, to avoid transmitting the sidelink communication in the resources reserved by other UEs or in the resources that UE 820 cannot receive. For example, the UE 810 may transmit the sidelink communication via resources that have not been reserved by other UEs or the resources that the UE 820 can receive, which may mitigate interference (for example, interference due to hidden nodes) for the sidelink communication.

Additionally or alternatively, example 800 may enable the UEs 810 and 820 to mitigate impairment of sidelink communications due to beam misalignment. The UE 810 transmitting the plurality of beam signals associated with the at least one IUC request may enable the UE 820 to determine the target beam (for example, responsive to, based on, or otherwise associated with measurements of the beam signals). The target beam may be a beam that is different from the current active beam (for example, if one or both of the UEs 810 or 820 have become displaced or rotated since the current active beam was determined). The IUC information including the indication of the target transmit or receive beam may enable the UE 810 to transmit the sidelink communication via the target beam. If the target beam is a receive beam, the UE 820 may receive the sidelink communication via the target receive beam.

The transmit UE transmitting the sidelink communication via the target transmit beam and the UE 820 receiving the sidelink communication via the receive beam associated with the target transmit beam may help to ensure that the receive UE receives the sidelink communication. For example, the target transmit beam may provide a stronger signal quality than a previous transmit beam that is no longer an optimal transmit beam due to relative movement (for example, displacement or rotation) between the receive UE and the transmit UE. Additionally or alternatively, the UE 810 transmitting the sidelink communication via a transmit beam associated with the target receive beam and the UE 820 receiving the sidelink communication via the target receive beam may help to ensure that the receive UE receives the sidelink communication. For example, the target receive beam may have a stronger signal quality than a previous receive beam that is no longer an optimal receive beam due to relative movement (for example, displacement or rotation) between the UE 810 and the UE 820.

Figure 9:
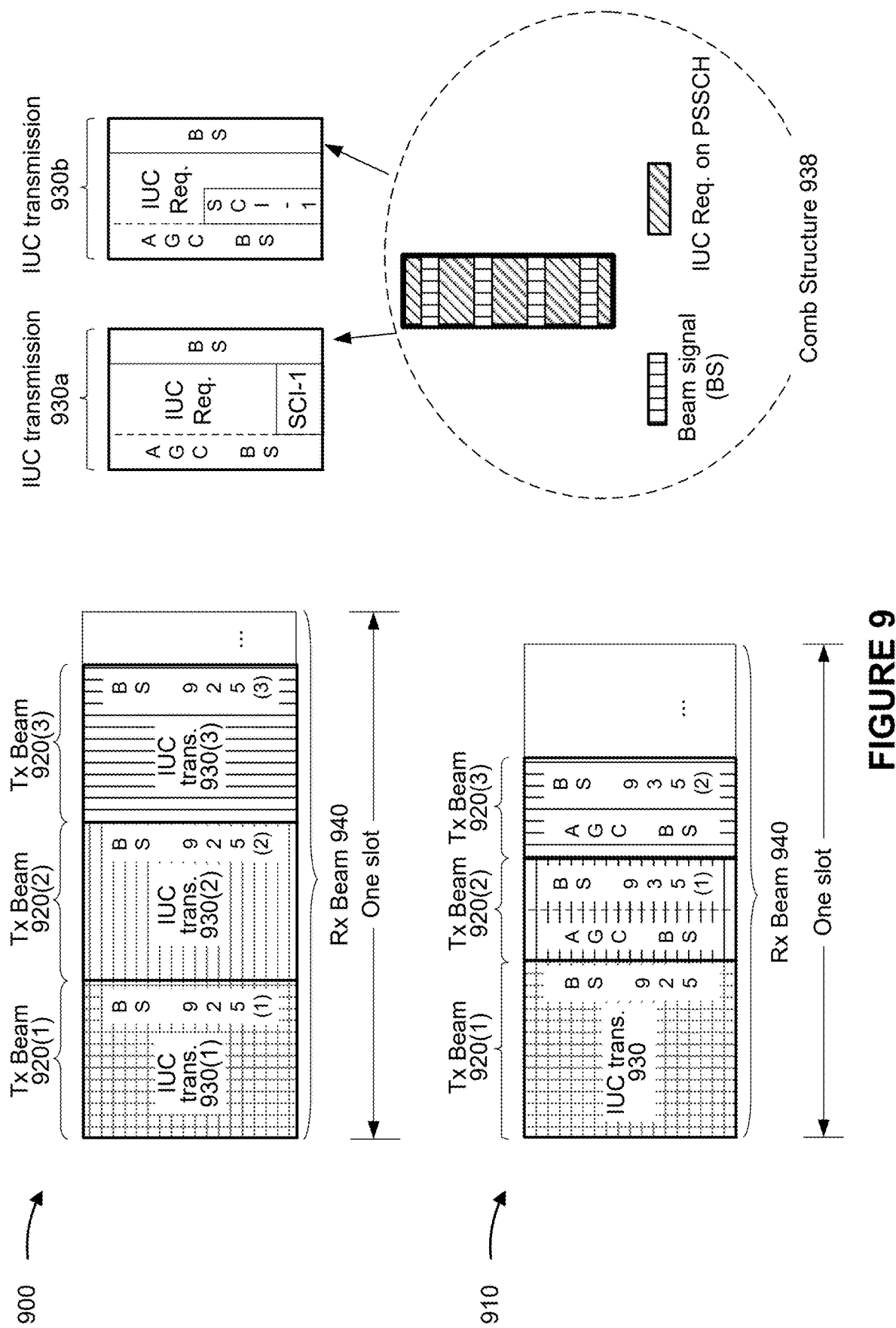
FIG. 9 is a diagram illustrating example beam sweeping implementations associated with transmit beam sweeping in accordance with the present disclosure.

FIG. 9 is a diagram illustrating example beam sweeping implementations 900 and 910 associated with transmit beam sweeping (for example, for transmit beam fine tuning) in accordance with the present disclosure.

For both beam sweeping implementations 900 and 910, a UE (for example, a transmit UE, such as UE 810) transmits, via a plurality of transmit beams 920(1)-920(3), a plurality of beam signals associated with at least one IUC request. For example, the transmit UE may sweep one or more transmit beams with one or more IUC requests in at least one slot. The transmit UE transmitting, via transmit beams 920(1)-920(3), a plurality of beam signals associated with at least IUC request may enable the transmit UE to fine-tune the current or active transmit beam used by the transmit UE for transmitting sidelink communications. The transmit UE may thereby correct for beam misalignment between the transmit UE and a receive UE, such as UE 820.

In beam sweeping implementation 900, the transmit UE transmits a plurality of IUC requests respectively associated with the plurality of beam signals 925(1)-925(3) via the transmit beams 920(1)-920(3). For example, the transmit UE may transmit one IUC transmission 930 (which may contain an IUC request) with beam signals 925(1)-925(3) in each of transmit beams 920(1)-920(3). For example, the transmit UE may sweep transmit beams 920(1)-920(3) with respective IUC transmissions 930(1)-930(3) containing beam signals 925(1)-925(3). In this case, the transmit beam information (for example, the beam information as described in details in FIG. 8) may be indicated in the beam signals 925(1)-925(3) respectively transmitted on the transmit beams 920(1)-920(3) (for example, as described above in connected with FIG. 8 with respect to determining the sequence of a beam signal), in the SCI-1 or SCI-2, or in an IUC request MAC-CE associated with IUC transmissions 930(1)-930(3) via transmit beams 920(1)-920(3)).

In beam sweeping implementation 910, the transmit UE transmits a single IUC request (for example, contained in IUC transmission 930), which is associated with the plurality of beam signals 925, 930(1), and 930(2), via an initial transmit beam of the transmit beams 920(1)-920(3) (for example, transmit beam 920(1)) according to a beam sweeping pattern (for example, a transmit beam sweeping pattern). For example, the transmit UE may transmit the IUC transmission 930 with beam signal 925 via transmit beam 920(1), and the plurality of beam signals 935(1) and 935(2), via transmit beams 920(1)-920(3). For example, the transmit UE may add the beam signals 935(1) and 935(2) at the end of the IUC request. In this case, the transmit beam information (for example, the beam information as described above in connection with FIG. 8) may be indicated in the beam signals 935(1) and 935(2) respectively carried on transmit beams 920(2) and 920(3) (for example, as described above in connection with FIG. 8 with respect to determining the sequence of the beam signal).

The IUC transmissions 930(1)-930(3) and/or 930 may have a first IUC transmission format 930a or a second IUC transmission format 930b. IUC transmission formats 930a and 930b may both include an automatic gain control (AGC) symbol, SCI-1 over one or more symbols, one or more IUC request symbols, and a beam signal symbol. The AGC symbol may be a copy of the beam signal symbol (for example, both the AGC symbol and the beam signal symbol may contain the same beam signal). The SCI-1 may be more than one symbol in IUC transmission format 930a and one symbol in IUC transmission format 930b. The IUC request symbols may include an IUC request carried by a PSSCH in a MAC-CE or an SCI-2 (for example, the SCI-2 may be multiplexed on the PSSCH). The beam signal symbol may include only a beam signal (for example, the beam sequence may be mapped continuously over resource elements or subcarriers in frequency as described above in connection with FIG. 8) or may include a beam signal and PSSCH that may carry SCI-2 or an IUC request MAC-CE (for example, the beam sequence may be mapped discontinuously over resource elements or subcarriers in frequency with a comb structure 938, as described above in connection with FIG. 8).

The transmit UE transmitting the plurality of IUC requests 930(1)-930(3) via the transmit beams 920(1)-920 (3) (for example, in accordance with beam sweeping implementation 900) may help to ensure that the receive UE receives at least one of the IUC requests (for example, in case one or more of the transmit beams 920(1)-920(3) are associated with poor beam quality due to severe beam misalignment caused by high mobility or frequent rotation). The transmit UE transmitting a single IUC request 930, associated with the plurality of beam signals 925, 935(1), and 935(2), via an initial transmit beam 920(1), such as an active beam or a paired beam (for example, in accordance with beam sweeping implementation 910) may reduce overhead relative to beam sweeping implementation 900 (for example, because beam sweeping implementation 910 includes fewer IUC transmissions than beam sweeping implementation 900 includes). As a result, beam sweeping implementation 910 may enable the transmit UE to include more beam signals in a single slot and, thus, sweep over more transmit beams than beam sweeping implementation 900 allows.

In some aspects, another UE (for example, a receive UE, such as UE 820) may receive the plurality of beam signals via a single receive beam 940. The receive UE may conduct measurements (for example, RSRP) with the beam signals and determine a target transmit beam of the plurality of transmit beams 920(1)-920(3). For example, the target transmit beam may provide the highest-quality beam signal, from among the plurality of beam signals 925(1)-925(3) or the plurality of beam signals 925, 935(1), and 935(2), as determined by the measurements (for example, the RSRP measurement(s) may be above a threshold for target transmit beam selection or for transmit beam switch). The receive UE may identify a receive beam associated with (for example, corresponding to) the target transmit beam. The receive UE may perform one or more sensing or resource selection operations associated with the receive beam. For example, the receive UE may attempt to detect SCIs from other UEs via the receive beam associated with the target transmit beam and determine which resources are reserved by the other UEs.

The receive UE may transmit, and the transmit UE may receive, IUC information. In some aspects, the IUC information may include an indication of the target transmit beam, and the transmit UE may transmit the sidelink communication via the target transmit beam (for example, switching to target transmit beam 920(3), which may be different from the active beam, such as transmit beam 920(1)). Additionally or alternatively, the IUC information may include an indication of one or more selected resources associated with the target transmit beam for a transmission of a sidelink communication (for example, preferred or non-preferred resources). In some aspects, the transmit UE may transmit the sidelink communication in accordance with the indication of resources in the IUC information.

Figure 10:
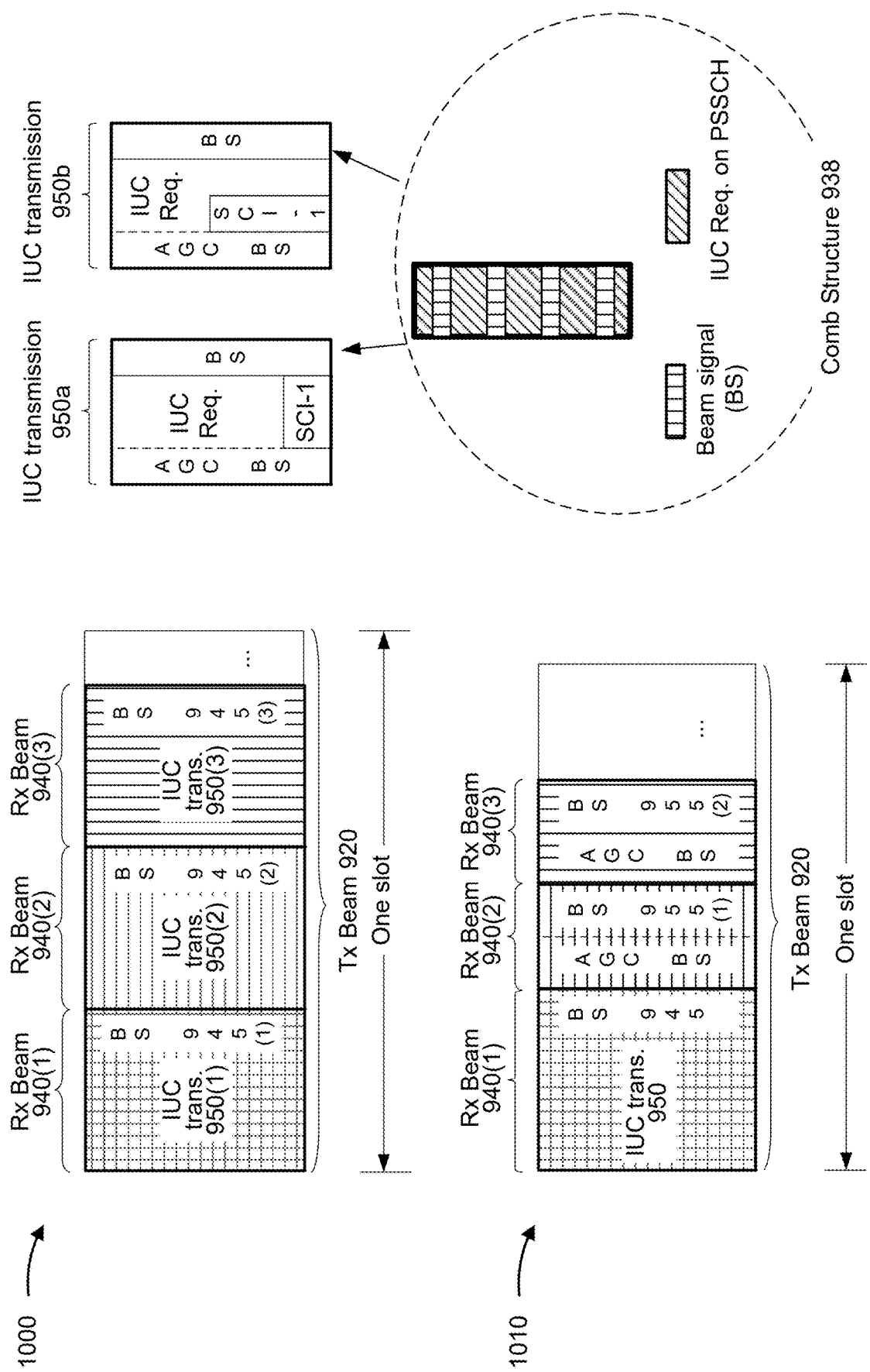
FIG. 10 is a diagram illustrating example beam sweeping implementations associated with receive beam sweeping in accordance with the present disclosure.

With continuing reference to FIG. 9, FIG. 10 is a diagram illustrating example beam sweeping implementations 1000 and 1010 associated with receive beam sweeping (for example, for receive beam fine tuning) in accordance with the present disclosure.

For both beam sweeping implementations 1000 and 1010, a UE (for example, a transmit UE, such as UE 810) may transmit a plurality of beam signals via a single transmit beam 920(1) (for example, active transmit beam or paired transmit beam) at respective times associated with a beam sweeping pattern (for example, a receive beam sweeping pattern). The plurality of beam signals may be associated with at least one IUC request. For example, the transmit UE may transmit the IUC request(s) via the transmit beam transmit beam 920(1) as the active transmit beam or paired transmit beam in one or more slots. Another UE (for example, a receive UE, such as UE 820) may receive the plurality of beam signals via a plurality of receive beams 940(1)-940(3) (for example, in accordance with the receive beam sweeping pattern). The receive UE may determine a target receive beam of the plurality of receive beams 940 (1)-940(3). For example, the receive UE may determine the target receive beam associated with measurements of the plurality of beam signals.

The transmit UE transmitting the plurality of beam signals via the single transmit beam 920(1) (for example, the active transmit beam or paired transmit beam) at respective times associated with the receive beam sweeping pattern, and the receive UE receiving, via receive beams 940(1)-940(3), the plurality of beam signals, may enable the receive UE to fine-tune the current or active receive beam used by the receive UE for receiving sidelink communications. The receive UE may thereby correct for beam misalignment between the transmit UE and the receive UE. In some examples, the receive UE may perform one or more sensing or resource selection operations associated with the target receive beam, which may reduce interference due to hidden nodes.

In beam sweeping implementation 1000, the receive UE receives a plurality of IUC requests, respectively associated with the plurality of beam signals 945(1)-945(3), via the plurality of receive beams 940(1)-940(3). For example, the receive UE may receive one of IUC transmissions 950(1)-950(3) (which may contain an IUC request) in each receive beam 940(1)-940(3). For example, the receive UE may sweep receive beams 940(1)-940(3) with respective IUC transmissions 950(1)-950(3).

In beam sweeping implementation 1010, the receive UE receives a single IUC request (for example, contained in IUC transmission 950), which is associated with the plurality of beam signals 945, 955(1), and 955(2), via an initial beam of the receive beams 940(1)-940(3) (for example, receive beam 940(1) as the active receive beam or paired receive beam). For example, the receive UE may receive the IUC transmission 950 via receive beam 940(1) and the plurality of beam signals 945, 955(1), and 955(2) via receive beams 940(1)-940(3), respectively. For example, the transmit UE may add the beam signals 955(1) and 955(2) at the end of the IUC request. The IUC transmissions 950(1)-950 (3) or 950 may have a first IUC transmission format 950a or a second IUC transmission format 950b, as described above in connection with the first IUC transmission format 930a or the second IUC transmission format 930b shown in FIG. 9.

The receive UE receiving the plurality of IUC requests via the receive beams 940(1)-940(3) (for example, in accordance with beam sweeping implementation 1000) may help to ensure that the receive UE successfully decodes at least one of the IUC requests (for example, in case one or more of the receive beams 940(1)-940(3) are associated with poor beam quality due to high mobility or frequent rotation). The receive UE receiving a single IUC request via an initial receive beam (for example, active receive beam or paired receive beam) of the receive beams 940(1)-940(3) (for example, in accordance with beam sweeping implementation 1010) may reduce overhead relative to beam sweeping implementation 1000 (for example, because beam sweeping implementation 1010 includes fewer IUC transmissions than beam sweeping implementation 1000 includes). As a result, beam sweeping implementation 1010 may enable the receive UE to receive more beam signals in a single slot and, thus, sweep over more receive beams than beam sweeping implementation 1000 allows.

The receive UE may conduct measurements with the beam signals 945(1)-945(3) or 945, 955(1), and 955(2) and determine a target receive beam of the plurality of receive beams 940(1)-940(3). For example, the target receive beam may provide the highest-quality beam signal (for example, the RSRP measurement of beam signals 945(1)-945(3) or 945, 955(1), and 955(2) may be above a threshold for receive beam selection or receive beam switch), from among the plurality of beam signals, as determined by the measurements. The receive UE may perform one or more sensing or resource selection operations associated with the target receive beam selected. For example, the receive UE may attempt to detect SCIs from other UEs via the receive beam associated with the target receive beam and determine which resources are reserved by the other UEs.

In some aspects, the receive UE may transmit, and the transmit UE may receive, IUC information. The IUC information may include an indication of the target receive beam or a transmit beam associated with the target receive beam. For example, the IUC information may include an indication of the target receive beam, which the transmit UE may use to identify the transmit beam associated with the target receive beam. The transmit UE may transmit the sidelink communication via the transmit beam. Additionally or alternatively, the IUC information may include an indication of one or more selected resources associated with the target receive beam for a transmission of a sidelink communication (for example, preferred or non-preferred resources). In some aspects, the transmit UE may transmit, and the receive UE may receive, the sidelink communication in accordance with the indication of resources in the IUC information.

Figure 11:
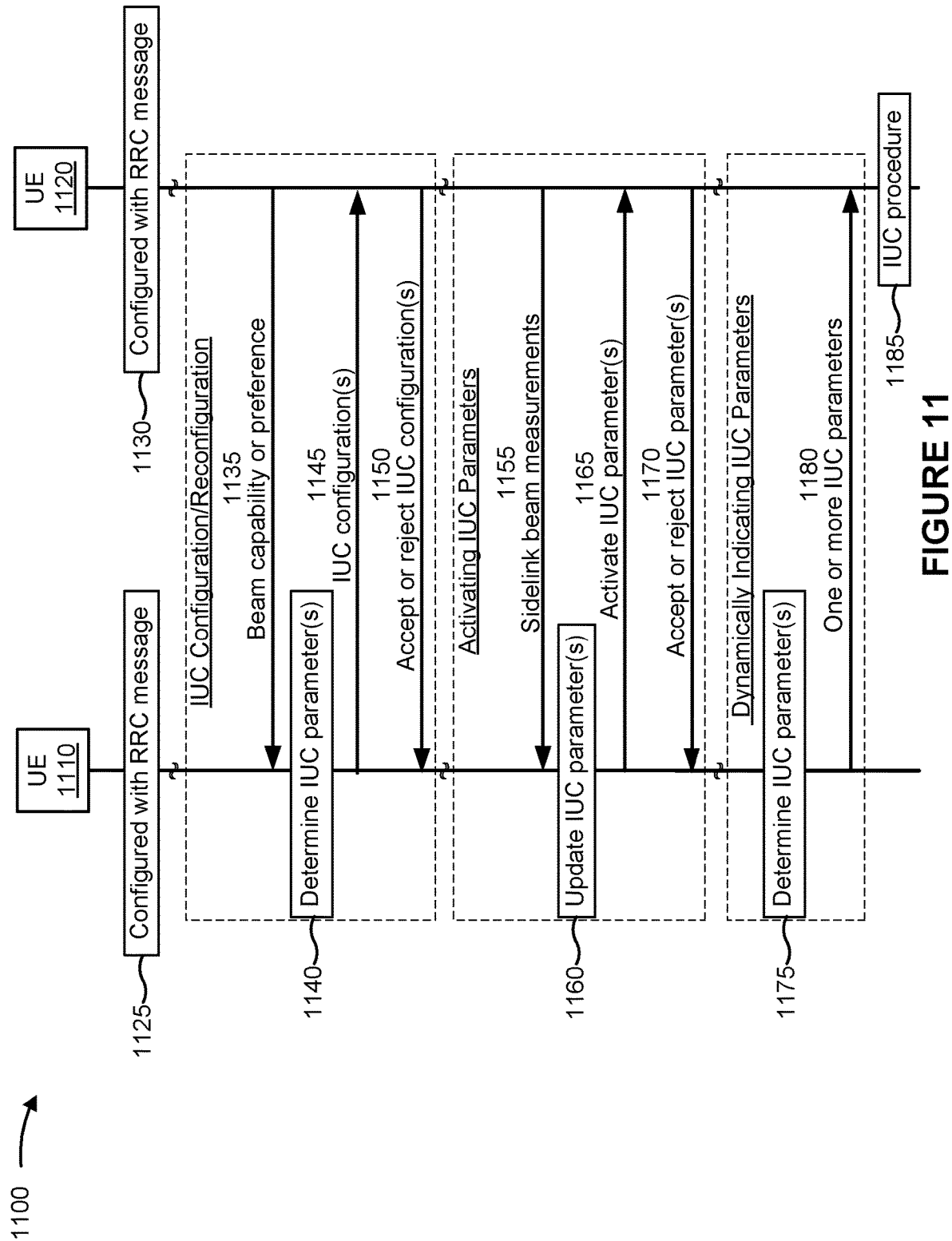
FIG. 11 is a diagram illustrating an example associated with beam-associated IUC parameter management in accordance with the present disclosure.

FIG. 11 is a diagram illustrating an example 1100 associated with beam-associated IUC parameter management in accordance with the present disclosure. As shown in FIG. 11, UE 1110 (for example, a transmit UE, such as UE 810) and UE 1120 (for example, a receive UE, such as UE 820) may communicate with one another over the sidelink.

The IUC request(s) transmitted by the transmit UE and received by the receive UE may be associated with one or more IUC parameters. In some aspects, the one or more IUC parameters may include a first parameter that enables the at least one IUC request to be associated with the plurality of beam signals. For example, the first parameter may enable beam fine tuning IUC (for example, transmit beam fine tuning or receive beam fine tuning).

In some aspects, the one or more IUC parameters may include a second parameter that indicates a quantity (for example, one, two, or three) of the set of transmit beams or transmit beam sweeping pattern (for example, a bit map of transmit beams) for fine tuning transmit beams or a quantity (for example, one, two, or three) of the set of receive beams or receive beam sweeping pattern (for example, a bit map of transmit beams) for fine tuning transmit beams. The second parameter may indicate any suitable quantity (for example, greater than three) of the set of transmit beams or the set of receive beams. In the case of transmit beam sweeping pattern for fine tuning Tx beams, the beam information as described above in connection with FIG. 8 and FIG. 9 may not be included in IUC request or in beam signal (for example, the receive UE 1120 may determine the transmit beam information responsive to, based on, or otherwise associated with the transmit beam sweeping pattern configuration).

In some aspects, the one or more IUC parameters may include a third parameter that indicates that the plurality of beam signals is to be transmitted via the set of transmit beams or received via the set of receive beams. For example, the third parameter may indicate whether the beam signals are to be transmitted via the same transmit beam or different transmit beams, or whether the beam signals are to be received via the same receive beam or different receive beams. For example, the third parameter may indicate whether the UEs 1110 and 1120 are to perform beam sweeping for transmit beam fine tuning or receive beam sweeping for receive beam fine tuning. Additionally or alternatively, the third parameter may include a beam signal sweeping pattern for fine tuning beams (for example, a list of beam signal indication(s), a range of beam signal indications, or a bit map of beam signal indication, where the beam signal indication(s) may be associated with the beam signal resources allocated for initial beam pairing). In the case of beam signal sweeping pattern for fine tuning beams, the beam signal information as described above in connection with FIG. 8 and FIG. 9 may not be included in an IUC request or beam signal (for example, the receive UE 1120 may determine the beam signal information responsive to, based on, or otherwise associated with the beam signal sweeping pattern configuration.

In some aspects, the one or more IUC parameters may include a fourth parameter that indicates a transmit beam type associated with the set of transmit beams or a receive beam type associated with the set of receive beams. For example, the fourth parameter may indicate whether the transmit beam(s) or receive beam(s) are narrow or wide.

In some aspects, the one or more IUC parameters may include a fifth parameter that indicates per-transmit-beam information associated with the set of transmit beams or per-receive-beam information associated with the set of receive beams. For example, the fifth parameter may indicate, for the transmit or receive beam(s), a transmission configuration indication (TCI) state index or identifier, a beam signal index or identifier, a transmit or receive beam index or identifier, or a transmit or receive spatial filter, among other examples. The per-transmit-beam information or per-receive-beam information may be associated with beam fine tuning IUC.

In some aspects, the one or more IUC parameters may include a sixth parameter that indicates a reference signal received power (RSRP) threshold or a channel busy ratio (CBR) measurement threshold for transmit beam fine tuning or selection or receive beam fine tuning or selection.

The one or more IUC parameters may include additional or alternative parameters. The one or more IUC parameters may include any combination of the first through sixth (or additional or alternative) parameters.

A first operation 1125 and a second operation 1130 may involve a network node (for example, network node 110) configuring the UEs 1110 and 1120 with the one or more IUC parameters in resource allocation mode 1. In the first operation 1125, the UE 1110 may receive a first RRC message that includes a configuration of the one or more IUC parameters. In a second operation 1130, the UE 1120 may receive a second RRC message that includes a configuration of the one or more IUC parameters if under network coverage. In case the UE 1120 is out of network coverage, the UE 1110 may forward the RRC message to the UE 1120 via sidelink (for example, PC5 RRC message). The RRC messages may configure the UEs 1110 and 1120 for sidelink services, with the one or more IUC parameters, using the SL-FR2Config parameter.

A third operation 1135, a fourth operation 1140, a fifth operation 1145, and a sixth operation 1150 may involve the UE 1110 configuring the UE 1120 with the one or more IUC parameters in a resource allocation mode 2. In the third operation 1135, the UE 1120 may transmit, and the UE 1110 may receive, an indication of a beam capability of the UE 1120 or preferred beam-associated IUC parameters for the UE 1120. In the fourth operation 1140, the UE 1110 may determine the one or more IUC parameters. In the fifth operation, the UE 1110 may transmit, and the UE 1120 may receive, an RRC message (for example, a PC5 RRC message) that includes one or more configurations of the one or more IUC parameters. In the sixth operation 1150, the UE 1120 may transmit, and the UE 1110 may receive, an indication of whether the UE 1110 accepts or rejects the configuration(s) of the one or more IUC parameters. Alternatively, for resource allocation mode 1, the UE 1110 may send beam capability or preferred beam-associated IUC parameters (including received from 1135) to the network and the network may determine accordingly the one or more IUC parameters transmitted in operation(s) 1125 and/or 1130.

A seventh operation 1155, an eighth operation 1160, a ninth operation 1165, and a tenth operation 1170 may involve the UE 1110 activating the one or more IUC parameters in a resource allocation mode 2. In the seventh operation 1155, the UE 1120 may transmit, and the UE 1110 may receive, an indication of one or more sidelink measurements. For example, the sidelink measurements may indicate that a signal quality associated with a current or active beam pair has degraded (for example, due to a displacement between the UEs 1110 and 1120 or a rotation of one or more of the UEs 1110 or 1120). In the eighth operation 1160, the UE 1110 may update the one or more IUC parameters. In the ninth operation 1165, the UE 1110 may transmit, and the UE 1120 may receive, a MAC-CE (for example, a PC5 MAC-CE) that includes an indication to activate the one or more IUC parameters or an indication to deactivate the one or more IUC parameters. In the tenth operation 1170, the UE 1120 may transmit, and the UE 1110 may receive, an indication of whether the UE 1110 accepts or rejects the activation or deactivation of the one or more IUC parameters. In resource allocation mode 1, a network node may transmit, and the UE 1110 or the UE 1120 may receive, a MAC-CE that includes an indication to activate the one or more IUC parameters or an indication to deactivate the one or more IUC parameters responsive to, based on, or otherwise associated with the measurement reports, received from UE 1110, which may include measurement reports from UE 1120 reported to UE 1110.

An eleventh operation 1175 and a twelfth operation 1180 may involve the UE 1110 dynamically indicating the one or more IUC parameters to the UE 1120. In the eleventh operation 1175, the UE 1110 may determine the IUC parameter(s). For example, the UE 1110 may determine the IUC parameter(s) for a TB based on the QoS of the TB (for example, finer beam fine tuning for a TB with high priority or reliability or short latency, or coarse beam fine tuning or no fine tuning for a TB with low priority or reliability or long latency). The UE 1110 may transmit, and the UE 1120 may receive, an indication of the one or more IUC parameter(s). For example, the UE 1110 may transmit, and the UE 1120 may receive, SCI or a MAC-CE that includes an indication of the one or more IUC parameters. For example, the SCI may be transmitted on the PSCCH and the MAC-CE may be transmitted on the PSSCH. For example, the UE 1110 may dynamically indicate the indication of the one or more IUC parameters in the SCI (for example, with the IUC request).

In a thirteenth operation 1185, the UE 1120 may perform an IUC procedure responsive to, based on, or otherwise associated with configuration, activation, or dynamic indication. For example, the UE 1120 may determine a target beam and perform one or more sensing or resource selection operations responsive to, based on, or otherwise associated with the target transmit beam or receive beam as described above in connection with FIG. 8 and FIG. 9. The UE 1120 may transmit, and the UE 1110 may receive, IUC information responsive to, based on, or otherwise associated with the IUC request. For resource allocation mode 1, the UE 1110 may transmit a sidelink buffer status report (SL-BSR) including associated QoS of data in the buffer or preferred beam-associated IUC parameters associated with the data in the buffer to the network, and the network may determine accordingly the one or more IUC parameters transmitted in sidelink grant (for example, indicated in DCI) for transmitting the data.

Figure 12:
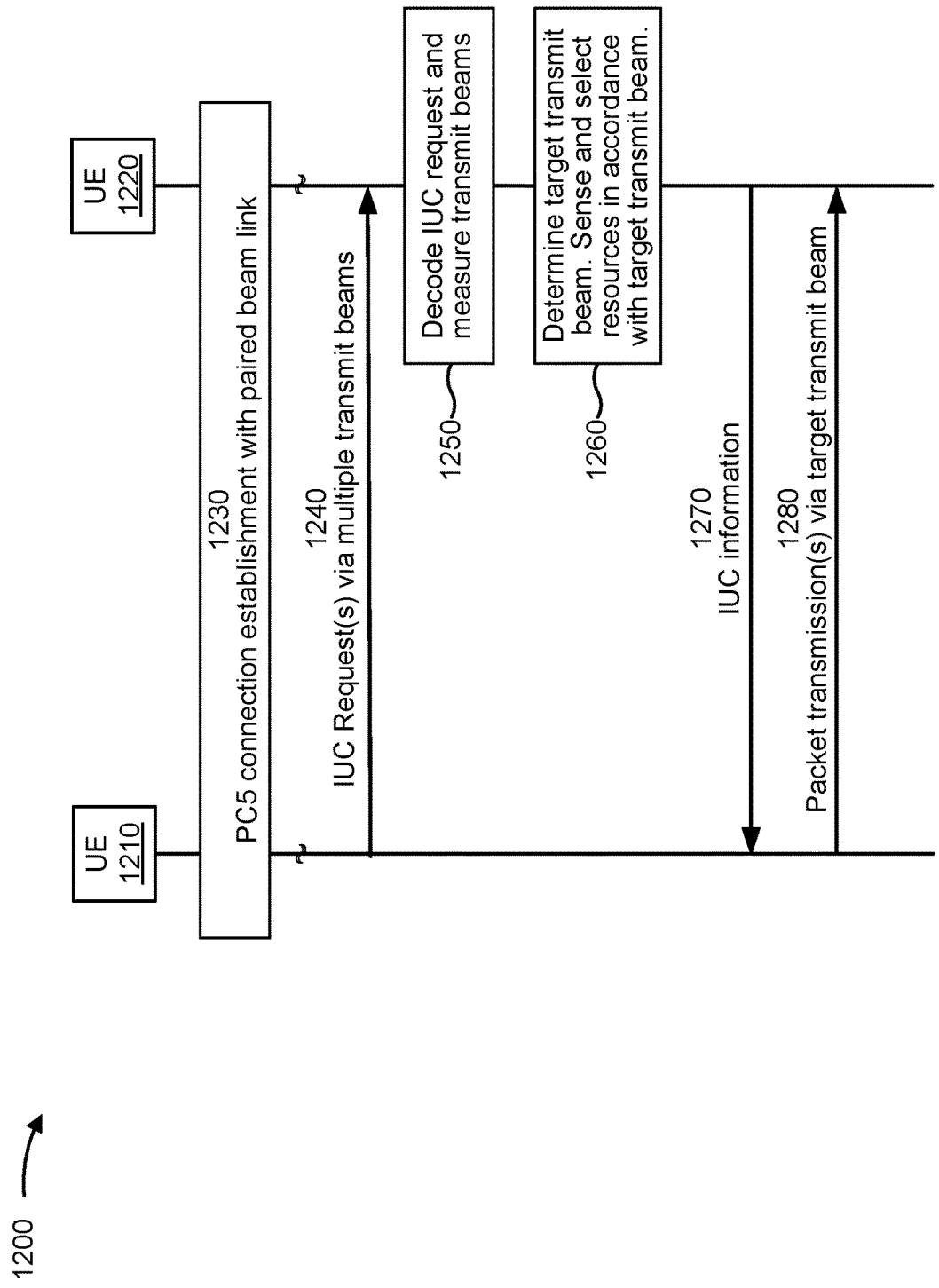
FIG. 12 is a diagram illustrating an example associated with sweeping transmit beams in accordance with the present disclosure.

FIG. 12 is a diagram illustrating an example 1200 associated with sweeping transmit beams in accordance with the present disclosure. As shown in FIG. 12, the UE 1210 (for example, a transmit UE, such as UE 810) and the UE 1220 (for example, a receive UE, such as UE 820) may communicate with one another over the sidelink in resource allocation mode 2.

In a first operation 1230, the UE 1210 and the UE 1220 establish a PC5 connection (for example, for unicast communication) with a paired beam link. One or more IUC parameters may be configured, reconfigured, or activated as described above in connection with FIG. 11. The UEs 1210 and 1220 may use an active paired beam link (for example, a transmit beam 920(1) and a receive beam 940(1) as described above in connection with FIG. 9 and FIG. 10) for a unicast communication.

In a second operation 1240, the UE 1220 may transmit at least one IUC request via at least one transmit beam and multiple beam signals via respective transmit beams (for example, for transmit beam fine tuning). For example, the UE 1210 may transmit the IUC request(s) in preparation for transmitting one or more packet(s) to the UE 1220. In a third operation 1250, the UE 1220 may monitor the transmissions from the UE 1210, decode the IUC request(s), and collect beam measurements on the beam signals.

In a fourth operation 1260, the UE 1220 may determine a target transmit beam responsive to, based on, or otherwise associated with the beam measurements. The target transmit beam may provide the highest-quality sidelink connection from among the transmit beams subject to the beam sweeping. The UE 1220 may identify a receive beam corresponding to the target transmit beam and use the receive beam for sensing and resource selection.

In a fifth operation 1270, the UE 1220 may transmit, and the UE 1210 may receive, IUC information. The IUC information may include beam information (for example, an indication of the target transmit beam. Additionally or alternatively, the IUC information may include an indication of one or more resources (for example, preferred or non-preferred resource set), selected by the UE 1220, for the target transmit beam.

In a sixth operation 1280, the UE 1210 may transmit the packet(s) responsive to, based on, or otherwise associated with the resources and the target transmit beam indicated in the received IUC information. For example, the UE 1210 may transmit the packets via the target transmit beam in one or more of the selected resources.

Figure 13:
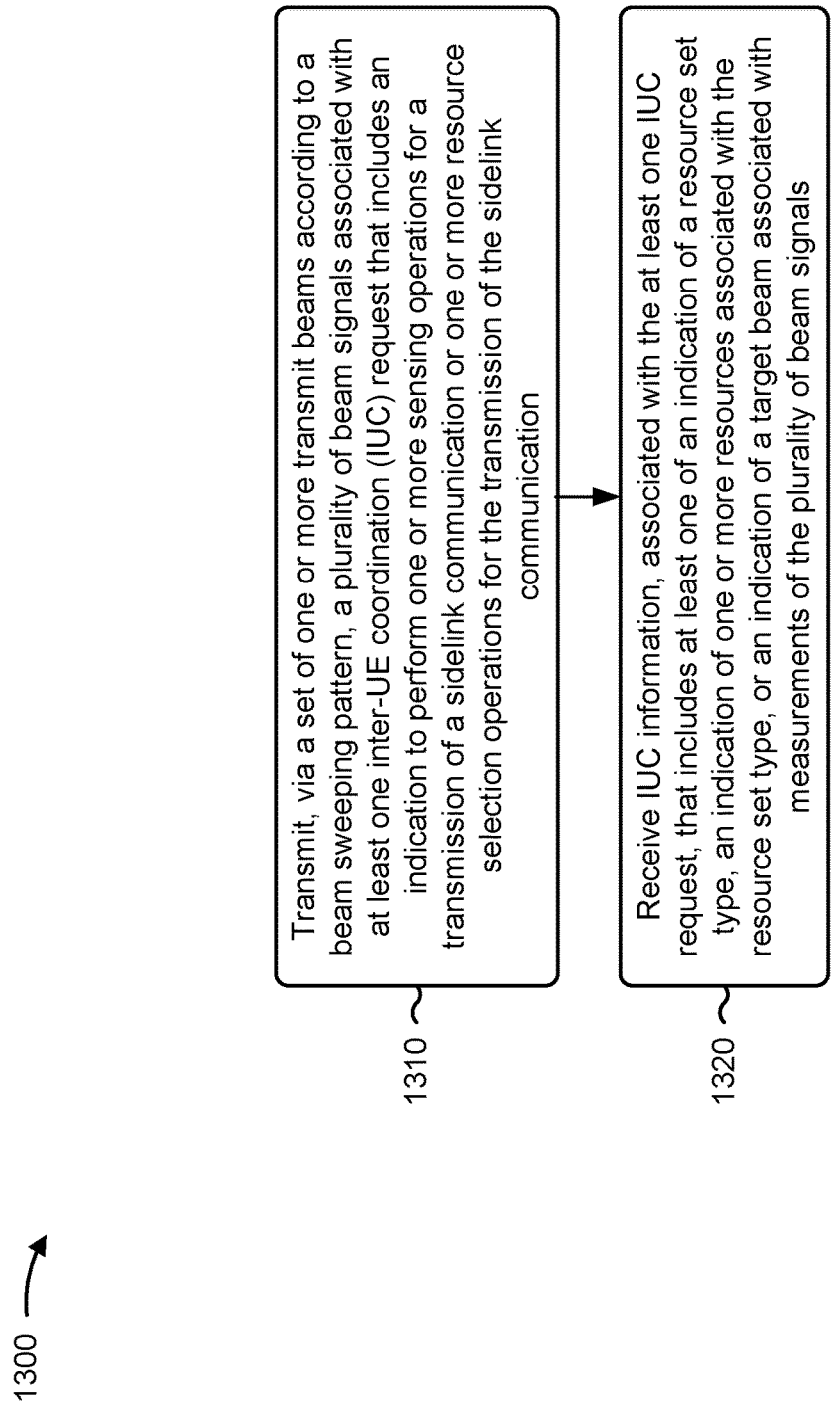
FIG. 13 is a flowchart illustrating an example process performed, for example, by a UE that supports beam-associated IUC in accordance with the present disclosure.

FIG. 13 is a flowchart illustrating an example process 1300 performed, for example, by a UE that supports beam-associated IUC in accordance with the present disclosure. Example process 1300 is an example where the UE (for example, UE 120) performs operations associated with beam-associated IUC.

As shown in FIG. 13, in some aspects, process 1300 may include transmitting, via a set of one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication (block 1310). For example, the UE (such as by using communication manager 140 or transmission component 1504, depicted in FIG. 15) may transmit, via a set of one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication, as described above.

As further shown in FIG. 13, in some aspects, process 1300 may include receiving IUC information, associated with the at least one IUC request, that includes at least one of an indication of a resource set type, an indication of one or more resources associated with the resource set type, or an indication of a target beam associated with measurements of the plurality of beam signals (block 1320). For example, the UE (such as by using communication manager 140 or reception component 1502, depicted in FIG. 15) may receive IUC information, associated with the at least one IUC request, that includes at least one of an indication of a resource set type, an indication of one or more resources associated with the resource set type, or an indication of a target beam associated with measurements of the plurality of beam signals, as described above.

Process 1300 may include additional aspects, such as any single aspect or any combination of aspects described below or in connection with one or more other processes described elsewhere herein.

In a first additional aspect, the set of transmit beams includes a plurality of transmit beams.

In a second additional aspect, alone or in combination with the first aspect, the at least one IUC request includes a plurality of IUC requests associated with the plurality of beam signals, and the process 1300 further includes transmitting, via the plurality of transmit beams, the plurality of IUC requests.

In a third additional aspect, alone or in combination with one or more of the first and second aspects, the at least one IUC request is a single IUC request associated with the plurality of beam signals, and the process 1300 further includes transmitting, via an initial transmit beam of the plurality of transmit beams according to the beam sweeping pattern, the IUC request.

In a fourth additional aspect, alone or in combination with one or more of the first through third aspects, the set of transmit beams is a single transmit beam, and transmitting the plurality of beam signals includes transmitting, via the single transmit beam, the plurality of beam signals at respective times associated with the beam sweeping pattern.

In a fifth additional aspect, alone or in combination with one or more of the first through fourth aspects, the plurality of beam signals is associated with one or more sequences that are mapped continuously to frequency resources.

In a sixth additional aspect, alone or in combination with one or more of the first through fourth aspects, the plurality of beam signals is associated with one or more sequences that are mapped discontinuously to frequency resources.

In a seventh additional aspect, alone or in combination with one or more of the first through sixth aspects, the IUC request is associated with one or more IUC parameters including one or more of a first parameter that enables the at least one IUC request to be associated with the plurality of beam signals, a second parameter that indicates a quantity of the set of transmit beams or a quantity of the set of receive beams, a third parameter that indicates that the plurality of beam signals is to be transmitted via the set of transmit beams or received via set of receive beams, a fourth parameter that indicates a transmit beam type associated with the set of transmit beams or a receive beam type associated with the set of receive beams, or a fifth parameter that indicates per-transmit-beam information associated with the set of transmit beams or per-receive-beam information associated with the set of receive beams.

In an eighth additional aspect, alone or in combination with one or more of the first through seventh aspects, process 1300 includes receiving or transmitting a second radio resource control message that includes a configuration of the one or more IUC parameters, receiving or transmitting a first MAC-CE that includes an indication to activate the one or more IUC parameters or an indication to deactivate the one or more IUC parameters, or transmitting sidelink control information that includes a first indication of the one or more IUC parameters or a second MAC-CE that includes a second indication of the one or more IUC parameters.

In a ninth additional aspect, alone or in combination with one or more of the first through eighth aspects, process 1300 includes transmitting the sidelink communication via the target beam where the target beam is a target transmit beam, or transmit the sidelink communication via a transmit beam associated with the target beam where the target beam is a target receive beam.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

Figure 14:
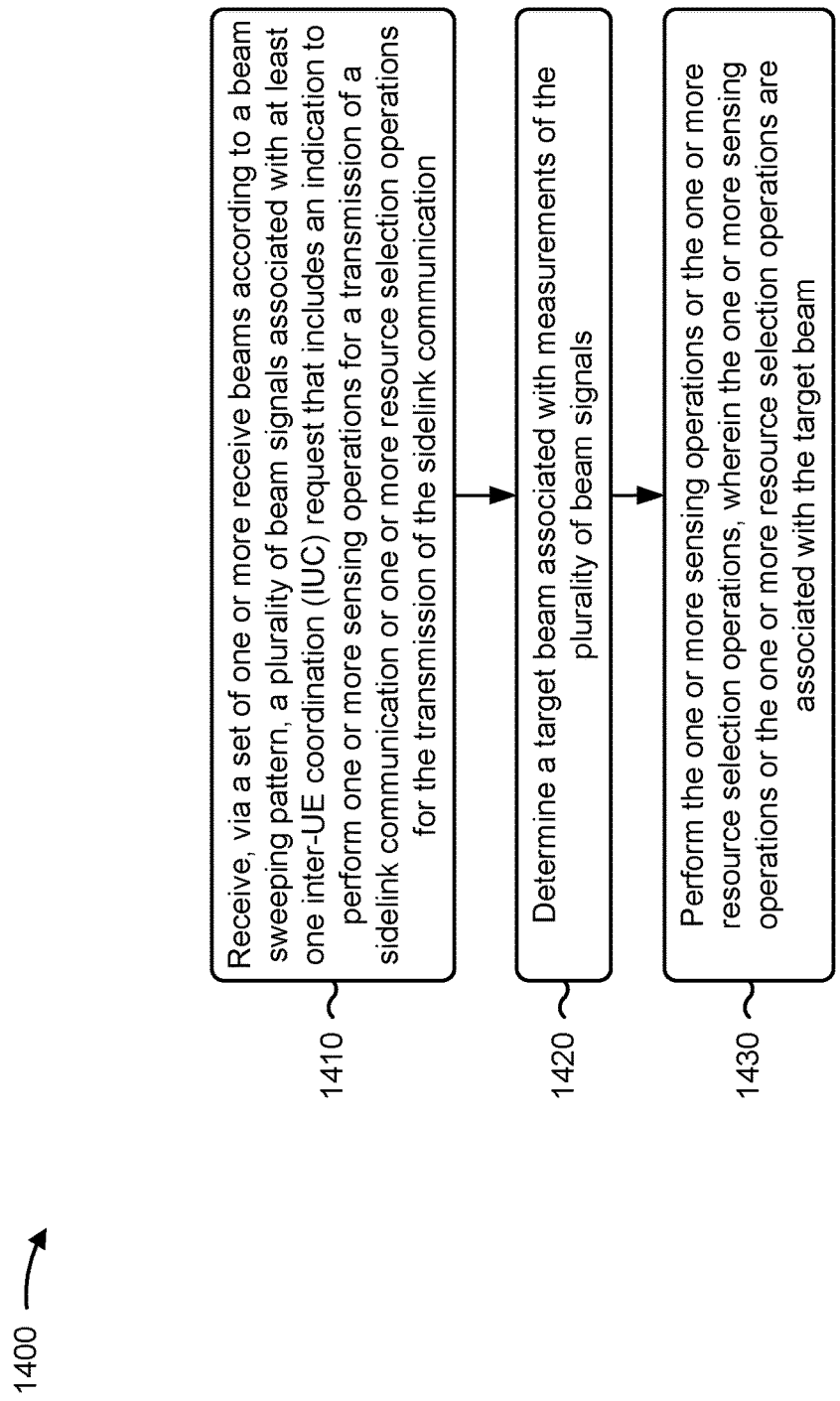
FIG. 14 is a flowchart illustrating an example process performed, for example, by a UE that supports beam-associated IUC in accordance with the present disclosure.

FIG. 14 is a flowchart illustrating an example process 1400 performed, for example, by a UE that supports beam-associated IUC in accordance with the present disclosure. Example process 1400 is an example where the UE (for example, UE 120) performs operations associated with beam-associated IUC.

As shown in FIG. 14, in some aspects, process 1400 may include receiving, via a set of one or more receive beams according to a beam sweeping pattern, a plurality of beam signals associated with at least one IUC request that includes an indication to perform one or more sensing operations for a transmission of a sidelink communication or one or more resource selection operations for the transmission of the sidelink communication (block 1410). For example, the UE (such as by using communication manager 140 or reception component 1602, depicted in FIG. 16) may receive, via a set of one or more receive beams according to a beam sweeping pattern, a plurality of beam signals associated with at least one IUC request that includes an indication to perform one or more sensing operations for a transmission of a sidelink communication or one or more resource selection operations for the transmission of the sidelink communication, as described above.

As further shown in FIG. 14, in some aspects, process 1400 may include determining a target beam associated with measurements of the plurality of beam signals (block 1420). For example, the UE (such as by using communication manager 140 or target beam determination component 1608, depicted in FIG. 16) may determine a target beam associated with measurements of the plurality of beam signals, as described above.

As further shown in FIG. 14, in some aspects, process 1400 may include performing the one or more sensing operations or the one or more resource selection operations, wherein the one or more sensing operations or the one or more resource selection operations are associated with the target beam (block 1430). For example, the UE (such as by using communication manager 140 or sensing or resource selection component 1610, depicted in FIG. 16) may perform the one or more sensing operations or the one or more resource selection operations, wherein the one or more sensing operations or the one or more resource selection operations are associated with the target beam, as described above.

Process 1400 may include additional aspects, such as any single aspect or any combination of aspects described below or in connection with one or more other processes described elsewhere herein.

In a first additional aspect, the measurements of the plurality of beam signals include one or more of measurements of beam signal received power associated with the plurality of beam signals or measurements of signal-to-interference-plus-noise ratios associated with the plurality of beam signals.

In a second additional aspect, alone or in combination with the first aspect, receiving the plurality of beam signals via the one or more receive beams includes receiving the plurality of beam signals via a single receive beam, the target beam is a target transmit beam of a plurality of transmit beams, and the one or more sensing operations are associated with a receive beam associated with the target transmit beam or the one or more resource selection operations are associated with the receive beam associated with the target transmit beam.

In a third additional aspect, alone or in combination with one or more of the first and second aspects, the set of receive beams include a plurality of receive beams, and the target beam is a target receive beam of the plurality of receive beams.

In a fourth additional aspect, alone or in combination with one or more of the first through third aspects, the at least one IUC request includes a plurality of IUC requests respectively associated with the plurality of beam signals, and the process 1400 further includes receiving, via the plurality of receive beams, the plurality of IUC requests.

In a fifth additional aspect, alone or in combination with one or more of the first through fourth aspects, the at least one IUC request is a single IUC request associated with the plurality of beam signals, and the process 1400 further includes receiving, via an initial receive beam of the plurality of receive beams according to the beam sweeping pattern, the IUC request.

In a sixth additional aspect, alone or in combination with one or more of the first through fifth aspects, process 1400 includes transmitting IUC information, associated with the IUC request, that includes an indication of one or more selected resources associated with the one or more resource selection operations.

In a seventh additional aspect, alone or in combination with one or more of the first through sixth aspects, process 1400 includes receiving the sidelink communication via the target beam where the target beam is a target receive beam or receiving the sidelink communication via a receive beam associated with the target beam where the target beam is a target transmit beam.

Although FIG. 14 shows example blocks of process 1400, in some aspects, process 1400 may include additional blocks, fewer blocks, different blocks, or differently arranged blocks than those depicted in FIG. 14. Additionally or alternatively, two or more of the blocks of process 1400 may be performed in parallel.

Figure 15:
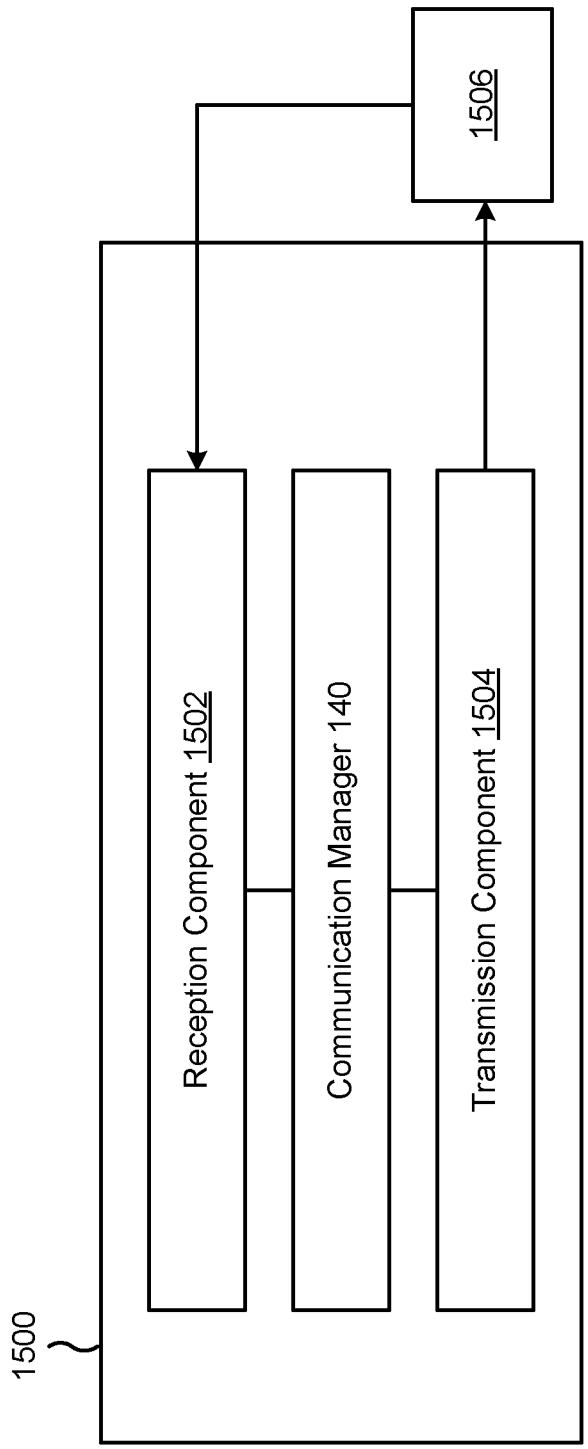
FIG. 15 is a diagram of an example apparatus for wireless communication that supports beam-associated IUC in accordance with the present disclosure.

FIG. 15 is a diagram of an example apparatus 1500 for wireless communication that supports beam-associated IUC in accordance with the present disclosure. The apparatus 1500 may be a UE, or a UE may include the apparatus 1500. In some aspects, the apparatus 1500 includes a reception component 1502, a transmission component 1504, and a communication manager 140, which may be in communication with one another (for example, via one or more buses). As shown, the apparatus 1500 may communicate with another apparatus 1506 (such as a UE, a network node, or another wireless communication device) using the reception component 1502 and the transmission component 1504.

In some aspects, the apparatus 1500 may be configured to and/or operable to perform one or more operations described herein in connection with FIGS. 8-12. Additionally or alternatively, the apparatus 1500 may be configured to and/or operable to perform one or more processes described herein, such as process 1300 of FIG. 13 and/or process 1400 of FIG. 14. In some aspects, the apparatus 1500 may include one or more components of the UE described above in connection with FIG. 2.

The reception component 1502 may receive communications, such as reference signals, control information, and/or data communications, from the apparatus 1506. The reception component 1502 may provide received communications to one or more other components of the apparatus 1500, such as the communication manager 140. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a modem, a demodulator, a MIMO detector, a receive processor, a controller/processor, and/or a memory of the UE described above in connection with FIG. 2.

The transmission component 1504 may transmit communications, such as reference signals, control information, and/or data communications, to the apparatus 1506. In some aspects, the communication manager 140 may generate communications and may transmit the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, and/or a memory of the UE described above in connection with FIG. 2. In some aspects, the transmission component 1504 may be co-located with the reception component 1502 in a transceiver.

The communication manager 140 may transmit or may cause the transmission component 1504 to transmit, via a set of one or more transmit beams according to a beam sweeping pattern, a plurality of beam signals associated with at least one IUC request that includes an indication to perform one or more sensing operations or one or more resource selection operations for transmission of a sidelink communication. The communication manager 140 may receive or may cause the reception component 1502 to receive IUC information, associated with the at least one IUC request, that includes at least one of an indication of a resource set type, an indication of one or more resources associated with the resource set type, or an indication of a target beam associated with measurements of the plurality of beam signals. In some aspects, the communication manager 140 may perform one or more operations described elsewhere herein as being performed by one or more components of the communication manager 140. The communication manager 140 may include a controller/processor and/or a memory of the UE described above in connection with FIG. 2.

The transmission component 1504 may transmit, via a set of one or more transmit beams according to a beam sweeping pattern, a plurality of beam signals associated with at least one IUC request that includes an indication to perform one or more sensing operations or one or more resource selection operations for transmission of a sidelink communication. The reception component 1502 may receive IUC information, associated with the at least one IUC request, that includes at least one of an indication of a resource set type, an indication of one or more resources associated with the resource set type, or an indication of a target beam associated with measurements of the plurality of beam signals.

The transmission component 1504 may transmit, via a plurality of transmit beams, a plurality of IUC requests.

The transmission component 1504 may transmit, via an initial transmit beam of a plurality of transmit beams, a single IUC request.

The transmission component 1504 may transmit a sidelink communication via a target transmit beam.

The transmission component 1504 may transmit the sidelink communication via a transmit beam associated with a target receive beam.

The reception component 1502 may receive or the transmission component 1504 may transmit a radio resource control message that includes a configuration of one or more IUC parameters.

The reception component 1502 may receive or the transmission component 1504 may transmit a first MAC-CE that includes an indication to activate the one or more IUC parameters or an indication to deactivate the one or more IUC parameters.

The transmission component 1504 may transmit sidelink control information that includes a first indication of the one or more IUC parameters or a second MAC-CE that includes a second indication of the one or more IUC parameters.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
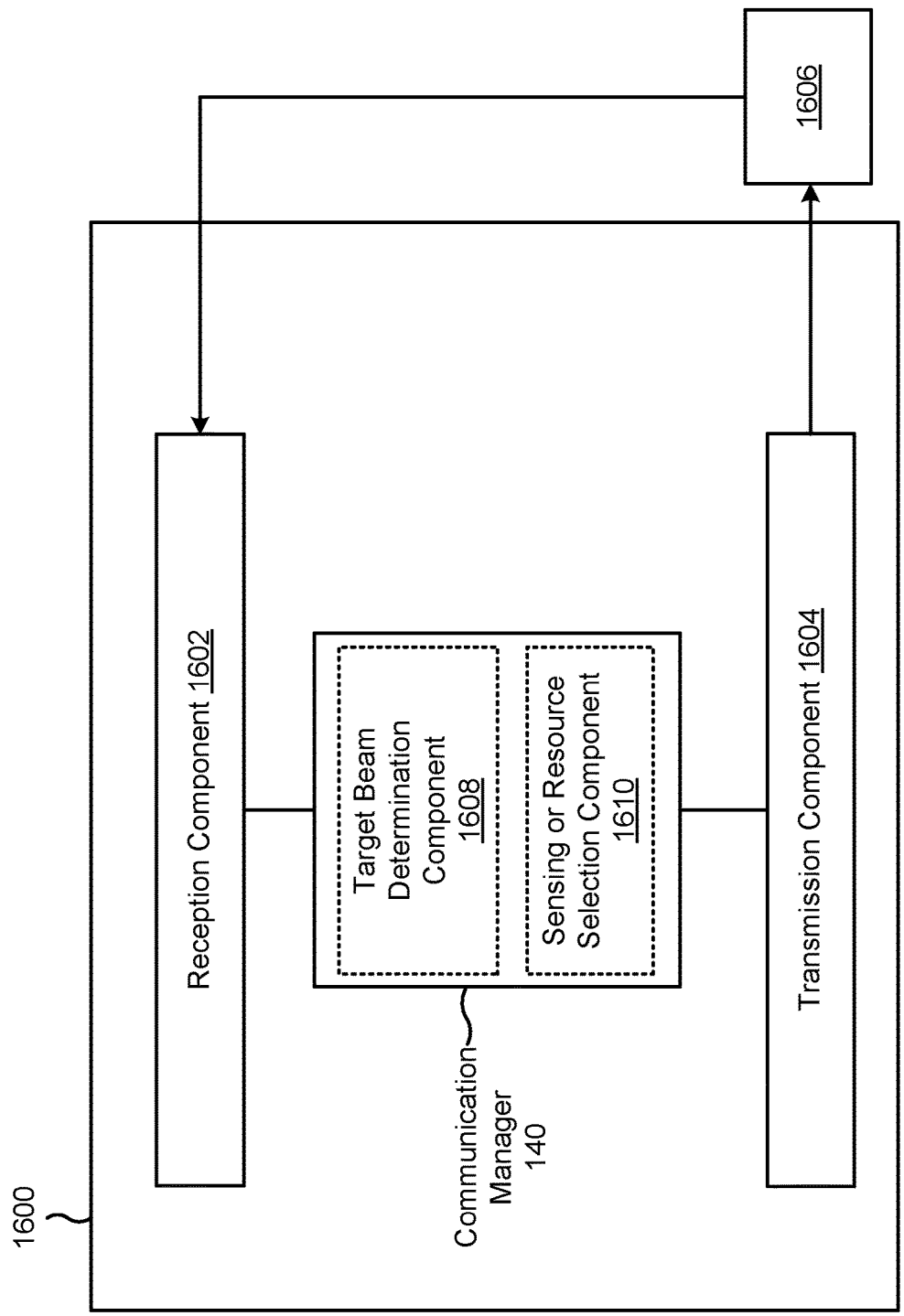
FIG. 16 is a diagram of an example apparatus for wireless communication that supports beam-associated IUC in accordance with the present disclosure.

FIG. 16 is a diagram of an example apparatus 1600 for wireless communication that supports beam-associated IUC in accordance with the present disclosure. The apparatus 1600 may be a UE, or a UE may include the apparatus 1600. In some aspects, the apparatus 1600 includes a reception component 1602, a transmission component 1604, and a communication manager 140, which may be in communication with one another (for example, via one or more buses). As shown, the apparatus 1600 may communicate with another apparatus 1606 (such as a UE, a network node, or another wireless communication device) using the reception component 1602 and the transmission component 1604.

In some aspects, the apparatus 1600 may be configured to and/or operable to perform one or more operations described herein in connection with FIGS. 8-12. Additionally or alternatively, the apparatus 1600 may be configured to and/or operable to perform one or more processes described herein, such as process 1300 of FIG. 13, and/or process 1400 of FIG. 14. In some aspects, the apparatus 1600 may include one or more components of the UE described above in connection with FIG. 2.

The reception component 1602 may receive communications, such as reference signals, control information, and/or data communications, from the apparatus 1606. The reception component 1602 may provide received communications to one or more other components of the apparatus 1600, such as the communication manager 140. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a modem, a demodulator, a MIMO detector, a receive processor, a controller/processor, and/or a memory of the UE described above in connection with FIG. 2.

The transmission component 1604 may transmit communications, such as reference signals, control information, and/or data communications, to the apparatus 1606. In some aspects, the communication manager 140 may generate communications and may transmit the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, and/or a memory of the UE described above in connection with FIG. 2. In some aspects, the transmission component 1604 may be co-located with the reception component 1602 in a transceiver.

The communication manager 140 may receive or may cause the reception component 1602 to receive, via a set of one or more receive beams, a plurality of beam signals associated with at least one IUC request that includes an indication to perform one or more sensing operations for a transmission of a sidelink communication or one or more resource selection operations for the transmission of the sidelink communication. The communication manager 140 may determine a target beam associated with measurements of the plurality of beam signals. The communication manager 140 may perform the one or more sensing operations or the one or more resource selection operations, wherein the one or more sensing operations or the one or more resource selection operations are associated with the target beam. In some aspects, the communication manager 140 may perform one or more operations described elsewhere herein as being performed by one or more components of the communication manager 140.

The communication manager 140 may include a controller/processor and/or a memory of the UE described above in connection with FIG. 2. In some aspects, the communication manager 140 includes a set of components, such as a target beam determination component 1608 and/or a sensing or resource selection component 1610. Alternatively, the set of components may be separate and distinct from the communication manager 140. In some aspects, one or more components of the set of components may include or may be implemented within a controller/processor and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive, via a set of one or more receive beams, a plurality of beam signals associated with at least one IUC request that includes an indication to perform one or more sensing operations for a transmission of a sidelink communication or one or more resource selection operations for the transmission of the sidelink communication. The target beam determination component 1608 may determine a target beam associated with measurements of the plurality of beam signals. The sensing or resource selection component 1610 may perform the one or more sensing operations or the one or more resource selection operations, wherein the one or more sensing operations or the one or more resource selection operations are associated with the target beam.

The reception component 1602 may receive, via a plurality of receive beams, a plurality of IUC requests.

The reception component 1602 may receive, via an initial receive beam of a plurality of receive beams according to the beam sweeping pattern, an IUC request.

The transmission component 1604 may transmit IUC information, associated with the IUC request, that includes an indication of one or more selected resources associated with the one or more sensing operations or the one or more resource selection operations.

The reception component 1602 may receiving the sidelink communication via the target beam, wherein the target beam is a target receive beam; or receiving the sidelink communication via a receive beam associated with the target beam, wherein the target beam is a target transmit beam.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method for wireless communication by a UE, comprising: transmitting, via a set of one or more transmit beams according to a beam sweeping pattern, a plurality of beam signals associated with at least one IUC request that includes an indication to perform one or more sensing operations for a transmission of a sidelink communication or one or more resource selection operations for the transmission of the sidelink communication; and receiving IUC information, associated with the at least one IUC request, that includes at least one of an indication of a resource set type, an indication of one or more resources associated with the resource set type, or an indication of a target beam associated with measurements of the plurality of beam signals.

Aspect 2: The method of Aspect 1, wherein the set of transmit beams includes a plurality of transmit beams.

Aspect 3: The method of Aspect 2, wherein the at least one IUC request is a plurality of IUC requests respectively associated with the plurality of beam signals, the method further comprising: transmitting, via the plurality of transmit beams, the plurality of IUC requests.

Aspect 4: The method of Aspect 2, wherein the at least one IUC request is a single IUC request associated with the plurality of beam signals, the method further comprising: transmitting, via an initial transmit beam of the plurality of transmit beams according to the beam sweeping pattern, the IUC request.

Aspect 5: The method of Aspect 1, wherein the set of transmit beams is a single transmit beam, and wherein transmitting the plurality of beam signals includes: transmitting, via the single transmit beam, the plurality of beam signals at respective times associated with the beam sweeping pattern.

Aspect 6: The method of any of Aspects 1-5, wherein the plurality of beam signals is associated with one or more sequences that are mapped continuously to frequency resources.

Aspect 7: The method of any of Aspects 1-5, wherein the plurality of beam signals is associated with one or more sequences that are mapped discontinuously to frequency resources.

Aspect 8: The method of any of Aspects 1-7, wherein the IUC request is associated with one or more IUC parameters including one or more of: a first parameter that enables the at least one IUC request to be associated with the plurality of beam signals, a second parameter that indicates a quantity of the set of transmit beams or a quantity of a set of one or more receive beams, a third parameter that indicates that the plurality of beam signals is to be transmitted via the set of transmit beams or received via the set of receive beams, a fourth parameter that indicates a transmit beam type associated with the set of transmit beams or a receive beam type associated with the set of receive beams, or a fifth parameter that indicates per-transmit-beam information associated with the set of transmit beams or per-receive-beam information associated with the set of receive beams.

Aspect 9: The method of Aspect 8, further comprising: receiving or transmitting a radio resource control message that includes a configuration of the one or more IUC parameters; receiving or transmitting a first MAC-CE that includes an indication to activate the one or more IUC parameters or an indication to deactivate the one or more IUC parameters; or transmitting sidelink control information that includes a first indication of the one or more IUC parameters or a second MAC-CE that includes a second indication of the one or more IUC parameters.

Aspect 10: The method of any of Aspects 1-9, further comprising: transmitting the sidelink communication via the target beam, wherein the target beam is a target transmit beam; or transmitting the sidelink communication via a transmit beam associated with the target beam, wherein the target beam is a target receive beam.

Aspect 11: A method for wireless communication by a UE, comprising: receiving, via a set of one or more receive beams according to a beam sweeping pattern, a plurality of beam signals associated with at least one inter-UE coordination (IUC) request that includes an indication to perform one or more sensing operations for a transmission of a sidelink communication or one or more resource selection operations for the transmission of the sidelink communication; determining a target beam associated with measurements of the plurality of beam signals; and performing the one or more sensing operations or the one or more resource selection operations, wherein the one or more sensing operations or the one or more resource selection operations are associated with the target beam.

Aspect 12: The method of Aspect 11, wherein the measurements of the plurality of beam signals include one or more of measurements of beam signal received power associated with the plurality of beam signals or measurements of signal-to-interference-plus-noise ratios associated with the plurality of beam signals.

Aspect 13: The method of any of Aspects 11-12, wherein receiving the plurality of beam signals via the set of receive beams includes: receiving the plurality of beam signals via a single receive beam, wherein the target beam is a target transmit beam of a plurality of transmit beams, and wherein the one or more sensing operations are associated with a receive beam associated with the target transmit beam or the one or more resource selection operations are associated with the receive beam associated with the target transmit beam.

Aspect 14: The method of any of Aspects 11-13, wherein the set of receive beams includes a plurality of receive beams, and wherein the target beam is a target receive beam of the plurality of receive beams.

Aspect 15: The method of Aspect 14, wherein the at least one IUC request includes a plurality of IUC requests respectively associated with the plurality of beam signals, the method further comprising: receiving, via the plurality of receive beams, the plurality of IUC requests.

Aspect 16: The method of Aspect 14, wherein the at least one IUC request is a single IUC request associated with the plurality of beam signals, the method further comprising: receiving, via an initial receive beam of the plurality of receive beams according to the beam sweeping pattern, the IUC request.

Aspect 17: The method of any of Aspects 11-16, further comprising: transmitting IUC information, associated with the IUC request, that includes an indication of one or more selected resources associated with the one or more sensing operations or the one or more resource selection operations.

Aspect 18: The method of any of Aspects 11-17, further comprising: receiving the sidelink communication via the target beam, wherein the target beam is a target receive beam; or receiving the sidelink communication via a receive beam associated with the target beam, wherein the target beam is a target transmit beam.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
    a processing system that includes one or more processors and one or more memories coupled with the one or more processors, the processing system configured to cause the UE to:
        transmit, via a set of one or more transmit beams according to a beam sweeping pattern, a plurality of beam signals associated with at least one inter-UE coordination (IUC) request that includes an indication to perform one or more sensing operations for a transmission of a sidelink communication or one or more resource selection operations for the transmission of the sidelink communication, wherein the one or more sensing operations involve sensing sidelink control information (SCI); and
        receive IUC information, associated with the at least one IUC request, that includes at least one of an indication of a resource set type, an indication of one or more resources associated with the resource set type, or an indication of a target beam associated with measurements of the plurality of beam signals.

2. The UE of claim 1, wherein the set of one or more transmit beams includes a plurality of transmit beams.

3. The UE of claim 2, wherein the at least one IUC request includes a plurality of IUC requests respectively associated with the plurality of beam signals, wherein the processing system is further configured to cause the UE to:
    transmit, via the plurality of transmit beams, the plurality of IUC requests.

4. The UE of claim 2, wherein the at least one IUC request is a single IUC request associated with the plurality of beam signals, wherein the processing system is further configured to cause the UE to:
    transmit, via an initial transmit beam of the plurality of transmit beams according to the beam sweeping pattern, the IUC request.

5. The UE of claim 1, wherein the set of one or more transmit beams is a single transmit beam, and wherein, to cause the UE to transmit the plurality of beam signals, the processing system is configured to cause the UE to:
    transmit, via the single transmit beam, the plurality of beam signals at respective times associated with the beam sweeping pattern.

6. The UE of claim 1, wherein the plurality of beam signals is associated with one or more sequences that are mapped continuously to frequency resources.

7. The UE of claim 1, wherein the plurality of beam signals is associated with one or more sequences that are mapped discontinuously to frequency resources.

8. The UE of claim 1, wherein the IUC request is associated with one or more IUC parameters including one or more of: a first parameter that enables the at least one IUC request to be associated with the plurality of beam signals, a second parameter that indicates a quantity of the set of one or more transmit beams or a quantity of a set of one or more receive beams, a third parameter that indicates that the plurality of beam signals is to be transmitted via the set of one or more transmit beams or received via the set of one or more receive beams, a fourth parameter that indicates a transmit beam type associated with the set of one or more transmit beams or a receive beam type associated with the set of one or more receive beams, or a fifth parameter that indicates per-transmit-beam information associated with the set of one or more transmit beams or per-receive-beam information associated with the set of one or more receive beams.

9. The UE of claim 8, wherein the processing system is further configured to cause the UE to:
    receive or transmit a radio resource control message that includes a configuration of the one or more IUC parameters;
    receive or transmit a first media access control (MAC) control element (MAC-CE) that includes an indication to activate the one or more IUC parameters or an indication to deactivate the one or more IUC parameters; or
    transmit control information that includes a first indication of the one or more IUC parameters or a second MAC-CE that includes a second indication of the one or more IUC parameters.

10. The UE of claim 1, wherein the processing system is further configured to cause the UE to:
    transmit the sidelink communication via the target beam, wherein the target beam is a target transmit beam; or
    transmit the sidelink communication via a transmit beam associated with the target beam, wherein the target beam is a target receive beam.

11. A user equipment (UE) for wireless communication, comprising:
    a processing system that includes one or more processors and one or more memories coupled with the one or more processors, the processing system configured to cause the UE to:

receive, via a set of one or more receive beams according to a beam sweeping pattern, a plurality of beam signals associated with at least one inter-UE coordination (IUC) request that includes an indication to perform one or more sensing operations for a transmission of a sidelink communication or one or more resource selection operations for the transmission of the sidelink communication, wherein the one or more sensing operations involve sensing sidelink control information (SCI);

determine a target beam associated with measurements of the plurality of beam signals; and perform the one or more sensing operations or the one or more resource selection operations, wherein the one or more sensing operations or the one or more resource selection operations are associated with the target beam.

12. The UE of claim 11, wherein the measurements of the plurality of beam signals include one or more of measurements of beam signal received power associated with the plurality of beam signals or measurements of signal-to-interference-plus-noise ratios associated with the plurality of beam signals.

13. The UE of claim 11, wherein, to cause the UE to receive the plurality of beam signals via the set of one or more receive beams, the processing system is configured to cause the UE to:

receive the plurality of beam signals via a single receive beam, wherein the target beam is a target transmit beam of a plurality of transmit beams, and wherein the one or more sensing operations are associated with a receive beam associated with the target transmit beam or the one or more resource selection operations are associated with the receive beam associated with the target transmit beam.

14. The UE of claim 11, wherein the set of one or more receive beams includes a plurality of receive beams, and wherein the target beam is a target receive beam of the plurality of receive beams.

15. The UE of claim 14, wherein the at least one IUC request includes a plurality of IUC requests respectively associated with the plurality of beam signals, and wherein the processing system is further configured to cause the UE to:

receive, via the plurality of receive beams, the plurality of IUC requests.

16. The UE of claim 14, wherein the at least one IUC request is a single IUC request associated with the plurality of beam signals, and wherein the processing system is further configured to cause the UE to:

receive, via an initial receive beam of the plurality of receive beams according to the beam sweeping pattern, the IUC request.

17. The UE of claim 11, wherein the processing system is further configured to cause the UE to:

transmit IUC information, associated with the IUC request, that includes an indication of one or more selected resources associated with the one or more resource selection operations.

18. The UE of claim 11, wherein the processing system is further configured to cause the UE to:

receive the sidelink communication via the target beam, wherein the target beam is a target receive beam; or receive the sidelink communication via a receive beam associated with the target beam, wherein the target beam is a target transmit beam.

19. A method for wireless communication by a user equipment (UE), comprising:

transmitting, via a set of one or more transmit beams according to a beam sweeping pattern, a plurality of beam signals associated with at least one inter-UE coordination (IUC) request that includes an indication to perform one or more sensing operations for a transmission of a sidelink communication or one or more resource selection operations for the transmission of the sidelink communication, wherein the one or more sensing operations involve sensing sidelink control information (SCI); and receiving IUC information, associated with the at least one IUC request, that includes at least one of an indication of a resource set type, an indication of one or more resources associated with the resource set type, or an indication of a target beam associated with measurements of the plurality of beam signals.

20. The method of claim 19, further comprising:

transmitting the sidelink communication via the target beam, wherein the target beam is a target transmit beam; or transmitting the sidelink communication via a transmit beam associated with the target beam, wherein the target beam is a target receive beam.

* * * * *